(12) United States Patent
Nakayama et al.

(10) Patent No.: US 8,056,137 B2
(45) Date of Patent: Nov. 8, 2011

(54) COMMUNICATION TERMINAL DEVICE AND COMPUTER DEVICE

(75) Inventors: Takehiro Nakayama, Yokohama (JP); Akira Kinno, Yokohama (JP); Atsushi Takeshita, Yokohama (JP)

(73) Assignee: NTT DoCoMo, Inc., Tokyo (JP)

(*) Notice: Subject to any disclaimer, the term of this patent is extended or adjusted under 35 U.S.C. 154(b) by 1315 days.

(21) Appl. No.: 11/445,307

(22) Filed: Jun. 2, 2006

(65) Prior Publication Data

US 2006/0274897 A1    Dec. 7, 2006

(30) Foreign Application Priority Data

Jun. 3, 2005   (JP) ................ P2005-164679
May 10, 2006  (JP) ................ P2006-131080

(51) Int. Cl.
  *G06F 21/04*   (2006.01)
  *H04L 29/06*   (2006.01)

(52) U.S. Cl. .......................... 726/25; 713/189

(58) Field of Classification Search .......... 726/2–5, 726/9, 26–30; 380/255, 258, 270; 713/150, 713/155, 166

See application file for complete search history.

(56) References Cited

U.S. PATENT DOCUMENTS

| | | | | |
|---|---|---|---|---|
| 7,069,439 | B1 * | 6/2006 | Chen et al. ............. | 713/172 |
| 7,457,951 | B1 * | 11/2008 | Proudler et al. ......... | 713/164 |
| 7,574,610 | B2 * | 8/2009 | Willman et al. ......... | 713/194 |
| 2004/0021636 | A1 * | 2/2004 | Venn et al. ............. | 345/163 |
| 2004/0103317 | A1 | 5/2004 | Burns | |
| 2005/0228874 | A1 * | 10/2005 | Edgett et al. ........... | 709/220 |
| 2006/0107313 | A1 * | 5/2006 | Crowley et al. ......... | 726/6 |
| 2008/0016569 | A1 * | 1/2008 | Hammer et al. ......... | 726/23 |

FOREIGN PATENT DOCUMENTS

| | | |
|---|---|---|
| EP | 1 282 023 A1 | 2/2003 |
| JP | 57-137957 | 8/1982 |
| JP | 2001-237941 | 8/2001 |
| JP | 2003-76585 | 3/2003 |
| JP | 2003-333157 | 11/2003 |
| JP | 2004-508619 | 3/2004 |
| WO | WO 97/07448 | 2/1997 |
| WO | WO 00/48061 | 8/2000 |
| WO | WO 02/17048 A2 | 2/2002 |
| WO | WO 02/27460 A1 | 4/2002 |

(Continued)

OTHER PUBLICATIONS

"Trusted Computing Platform Alliance (TCPA)", Compaq Computer Corporation, Hewlett-Packard Company, IBM Corporation, Intel Corporation, Microsoft Corporation, Main Specification, Version 1.1b, Feb. 22, 2002, pp. 1-322 with Cover Sheet and Table of Contents.

(Continued)

*Primary Examiner* — Gilberto Barron, Jr.
*Assistant Examiner* — Abdulhakim Nobahar
(74) *Attorney, Agent, or Firm* — Oblon, Spivak, McClelland, Maier & Neustadt, L.L.P.

(57) ABSTRACT

A communication terminal device includes a wireless communication unit, an integrity measurement request unit, a cryptographic processing unit, a pointing unit. The integrity measurement request unit generates a command to request another computer device to measure integrity. The cryptographic processing unit performs cryptographic processing concerning communication with the another computer device. The pointing unit acquires positional information when a result of the integrity measurement satisfies a predetermined condition.

13 Claims, 20 Drawing Sheets

FOREIGN PATENT DOCUMENTS

WO     WO 03/107170 A1     12/2003

OTHER PUBLICATIONS

Siani Pearson, et al., "The Trusted Platform in Front of You", Trusted Computing Platforms: TCPA technology in context, Jul. 2002, pp. 264-277.

"TCG Specification Architecture Overview", Specification Revision 1.2 TCG Specification Architecture Overview, XP002413737, Apr. 28, 2004, 54 pages.

European Office Action issued Mar. 2, 2011, in Patent Application No. 06 011 492.3.

\* cited by examiner

TOP SURFACE

BOTTOM SURFACE

SIDE SURFACE

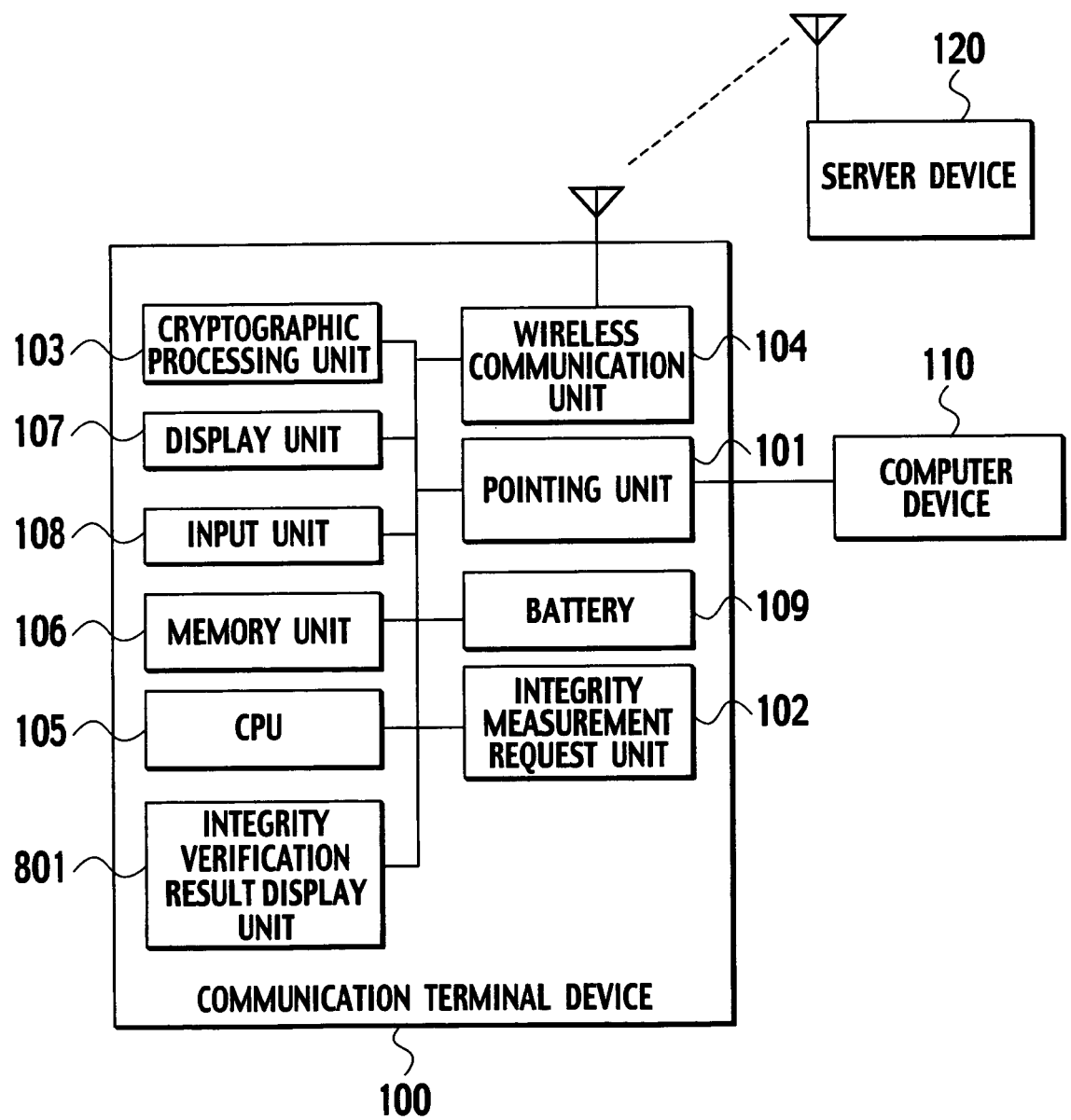

TOP SURFACE

BOTTOM SURFACE

SIDE SURFACE

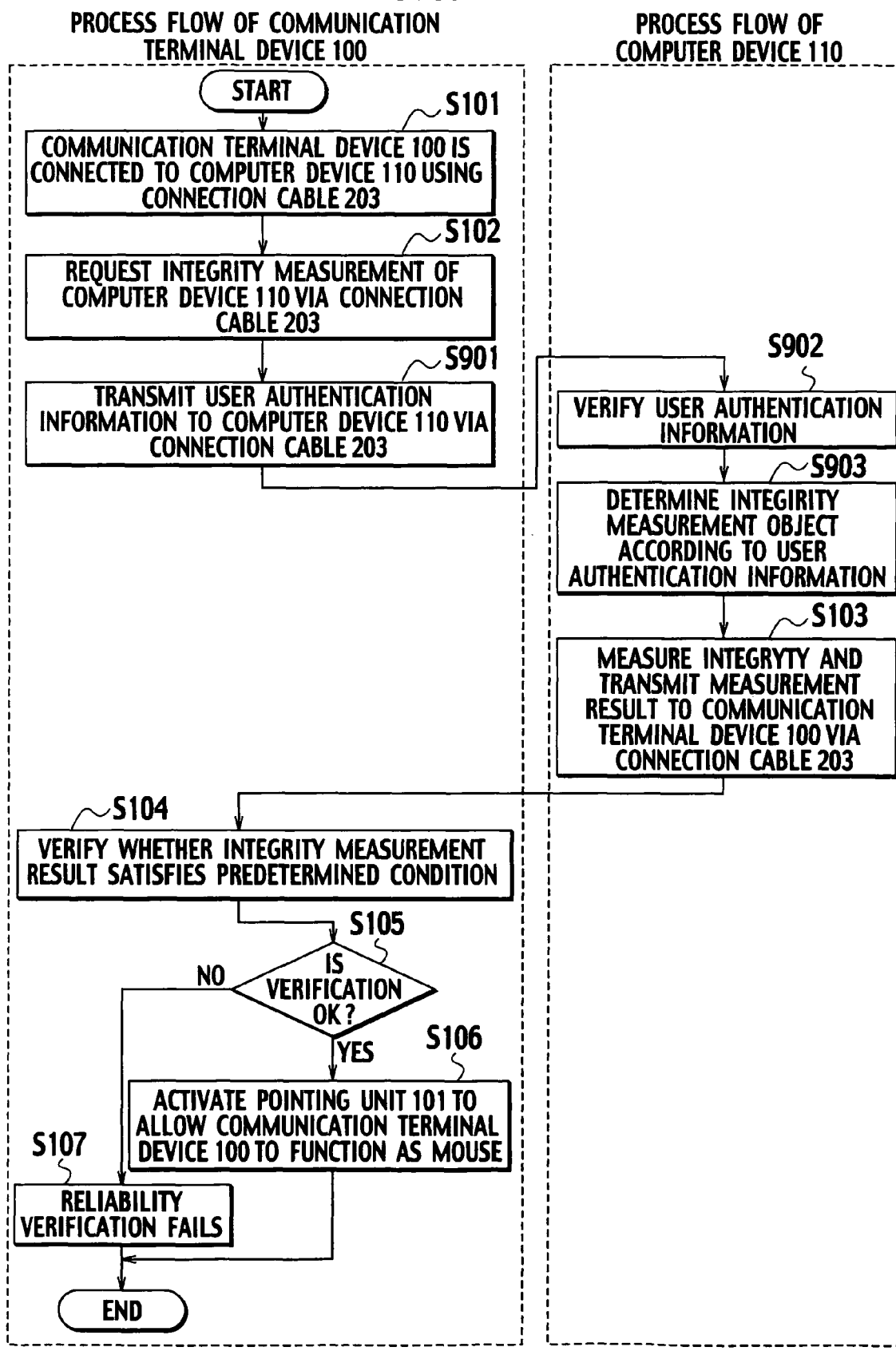

COMMUNICATION TERMINAL DEVICE AND COMPUTER DEVICE

CROSS REFERENCE TO RELATED APPLICATIONS

This application is based upon and claims the benefit of priority from prior Japanese Patent Application P2005-164679 filed on Jun. 3, 2005 and P2006-131080 filed on May 10, 2006; the entire contents of which are incorporated by reference herein.

BACKGROUND OF THE INVENTION

1. Field of the Invention

The present invention relates to a communication terminal device and a computer device and specifically, relates to a portable communication terminal device which has a function equivalent to a mouse used as a pointing device of the computer device and can verify the reliability of the computer device.

2. Description of the Related Art

When a user uses a computer which is not the user's own at a place where the user goes or the like, if whether the computer is reliable can be verified, the user can use the computer for purposes critical in security such as electronic commerce and access to a company's private network, thus improving the convenience of the user.

Specifications to prove a computer to be reliable have been proposed by TCPA (TCG) (for example, see Compaq Computer Corporation, Hewlett-Packard Company, IBM Corporation, Intel Corporation, Microsoft Corporation, "Trusted Computing Platform Alliance (TCPA) Main Specification Version 1.1b", 22 Feb. 2002, http://www.trustedcomputing.org/docs/main %20v11b.pdf). However, these specifications are based on cryptographic processing, and an entity challenging the reliability of the computer also must have a cryptographic capability. Specifically, to verify the reliability of the computer at the place where the user goes, the user has to bring any equipment including the cryptographic capability. Herein, the equipment needs to provide excellent portability and reliability for the user.

A method in which a user verifies the reliability of the computer using a smart card has been therefore disclosed (for example, see "Trusted Computing Platforms: TCPA technology in context", Siani Pearson, et al, Published July, 2002 by Prentice Hall PTR, ISBN 0-13-009220-7". The smart card provides excellent portability and tamper resistance, which is reliable equipment for the user. However, the smart card does not include an I/O function and needs a device to transmit results of reliability verification of the computer to the user. In "Trusted Computing Platforms: TCPA Technology in context", a user previously stores in the smart card secret information (a particular image or word) that only the user can know, and the smart card challenges the computer. Only when obtaining the result that the computer is reliable, the smart card transmits the secret information to the computer. The secret information is displayed on a display of the computer, so that the user can verify the reliability of the computer.

This method allows the user to verify the reliability of the computer before the computer is brought into use but does not provide a mechanism allowing the user to easily know that the reliability of the computer continues while the computer is in use. Accordingly, for example, it is highly possible that the user does not know if the computer is invaded by a virus during use and carries out an operation dangerous to the security. Moreover, when the secret information that only the user can know is repeatedly used, the secret information used in the past remains in the computer, and a malicious person can use the secret information to cause a unreliable computer to display the same and mislead the user.

In the light of the aforementioned problem, an object of the present invention is to provide a communication terminal device and a computer device which can perform easy, continuous, and sure verification whether a computer is reliable when the computer is used.

SUMMARY OF THE INVENTION

A first aspect of the present invention is to provide a communication terminal device including a wireless communication unit, including; (A) an integrity measurement request unit configured to generate a command to request another computer device to measure integrity; (B) a cryptographic processing unit configured to perform cryptographic processing concerning communication with the another computer device; and, (C) a pointing unit configured to acquire positional information when a result of the integrity measurement satisfies a predetermined condition.

A second aspect of the present invention is to provide a communication terminal device including a wireless communication unit, including: (A) an integrity measurement request unit configured to generate a command to request another computer device to measure integrity; (B) a cryptographic processing unit configured to perform cryptographic processing concerning communication with the another computer device; and (C) a key input unit configured to acquire key information when the result of the integrity measurement satisfies a predetermined condition.

A third aspect of the present invention is to provide a communication terminal device including a wireless communication unit, including: (A) an integrity measurement request unit configured to generate a command to request another computer device to measure integrity; (B) a cryptographic processing unit configured to perform cryptographic processing concerning communication with the another computer device; and (C) a remote control unit configured to enable a function to remotely control the another computer device when the result of the integrity measurement satisfies a predetermined condition.

A forth aspect of the present invention is to provide a computer device, including: (A) an integrity measurement unit configured to measure integrity in response to a request from a communication terminal device which includes: a wireless communication unit; an integrity measurement request unit generating a command to request another computer device to measure integrity; a cryptographic processing unit performing cryptographic processing concerning communication with the another computer device; and a pointing unit acquiring positional information when the result of the integrity measurement satisfies a predetermined condition; and (B) a display unit configured to display secret information received from the communication terminal device.

A fifth aspect of the present invention is to provide a computer device, including: (A) an integrity measurement unit configured to measure integrity in response to a request from a communication terminal device which includes: a wireless communication unit; an integrity measurement request unit generating a command to request another computer device to measure integrity; a cryptographic processing unit performing cryptographic processing concerning communication with the another computer device; and a pointing unit acquiring positional information when the result of the integrity measurement satisfies a predetermined condition; and (B) a user authentication information verification unit configured to verify user authentication information received from the communication terminal device and changing the integrity measured by the integrity measurement unit according to the user authentication information.

BRIEF DESCRIPTION OF THE DRAWINGS

FIG. 8 is a block diagram of a communication system according to a fourth embodiment.

FIG. 20 is a flowchart showing a reliability verification method according to a thirteenth embodiment.

DETAILED DESCRIPTION OF THE INVENTION

Figure 1:
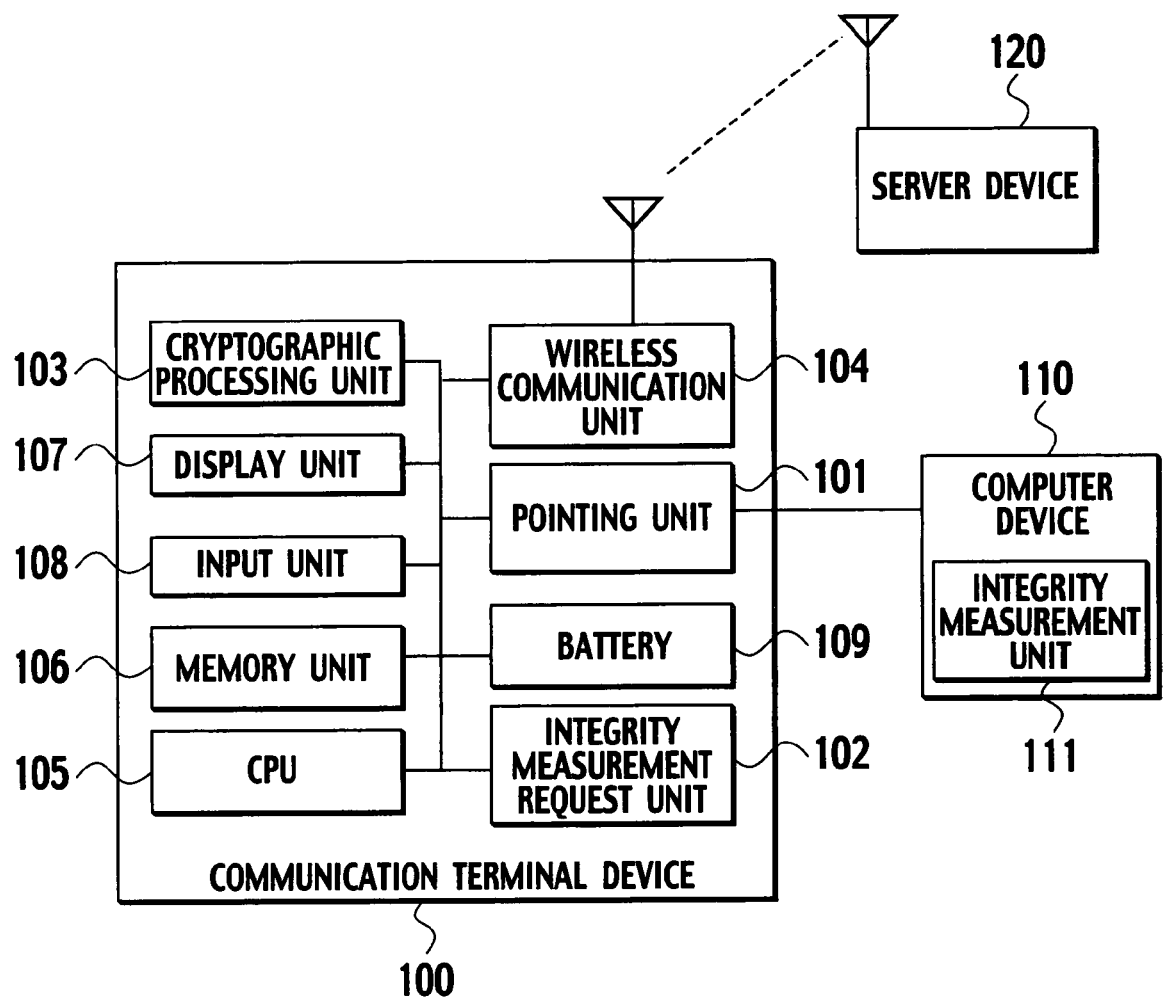
FIG. 1 is a block diagram of a communication system according to a first embodiment.

Various embodiments of the present invention will be described with reference to the accompanying drawings. It is to be noted that the same or similar reference numerals are applied to the same or similar parts and elements throughout the drawings, and the description of the same of similar parts and elements will be omitted or simplified.

First Embodiment (Communication System)

A communication system according to a first embodiment includes a communication terminal device 100, a computer device 110, and a server device 120 of a trusted third party as shown in FIG. 1.

The communication terminal device 100 is portable wireless communication equipment such as a PDA with a communication function added, a mobile phone, or a PHS. The communication terminal device 100 includes a function equivalent to a mouse used as a pointing device of the computer device 110 and is capable of verifying reliability of the computer device 110.

As shown in FIG. 1, the communication terminal device 100 includes a pointing unit 101, an integrity measurement request unit 102, a cryptographic processing unit 103, a wireless communication unit 104, a CPU 105, a memory unit 106, a display unit 107, an input unit 108, and a battery 109.

The pointing unit 101 includes a same function as that of an existing computer mouse (input device) and acquires positional information when a result of integrity measurement satisfies a predetermined condition (details are described later).

The integrity measurement request unit 102 creates a command to request a (external) computer to measure integrity (details are described later). This command is transmitted to the computer device 110 via (a connection cable of) the pointing unit 102.

The cryptographic processing unit 103 includes various types of cryptographic functions used for authentication between the communication terminal device 100 and the computer device 110, verification of signature data of the computer device 110, and the like. The cryptographic processing unit performs, for example, cryptographic processing for communication messages between the communication terminal device and another computer, the result of verification of integrity measurement, and the like. The cryptographic processing unit 103 may be implemented as a dedicated processor or may be implemented in such a manner that cryptographic processing is described as software and actually carried out with the CPU 105.

The wireless communication unit 104 performs communication through a wireless network such as a mobile phone network, a PHS network, or a wireless LAN.

The CPU 105 includes a function to perform various processing operations as a communication terminal device.

The memory unit 106 stores various types of data and is composed of a magnetic disk, flash memory, or the like. The memory unit 106 stores, for example, software controlling the communication terminal device 100 (communication software and an operating system), software for integrity measurement, and data for integrity measurement (a public key issued by a manufacturer of the computer and the like).

The display unit 107 is composed of a liquid crystal display or the like and is used as means for providing a display user interface as a mobile phone and a display user interface for integrity measurement.

The input unit 108 is composed of a keypad or the like and used as means for providing an input user interface as a mobile phone and an input user interface for integrity measurement.

The battery 109 supplies power necessary for operating the communication terminal device 100.

Figure 2A:
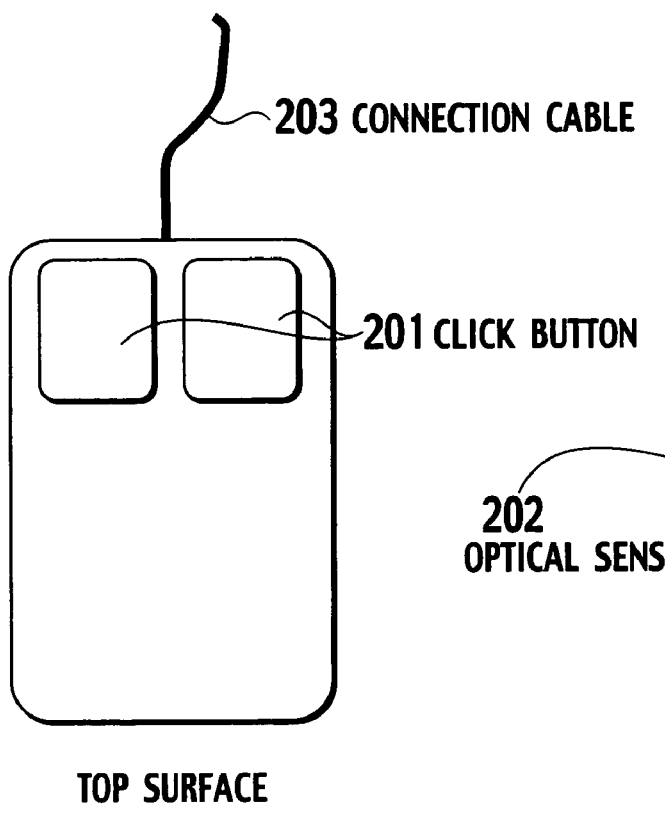
FIGS. 2A, 2B and 2C are an external view of a pointing unit according to the first embodiment.
Figure 2B:
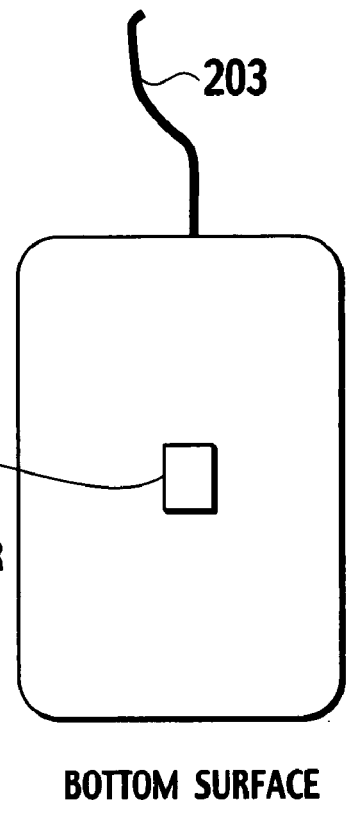
Figure 2C:
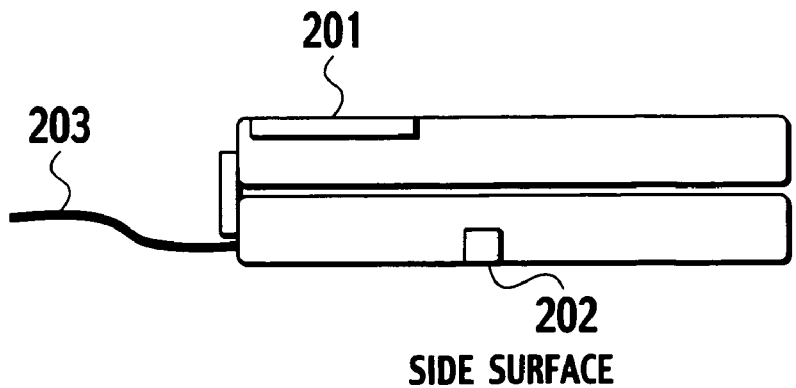

As a modification, the battery 109 of the communication terminal device 100 may be supplied with power from the computer device 110 via a connection cable 203 (see FIG. 2). This makes it possible to avoid the situation where the battery 109 of the communication terminal device 100 runs out to prevent integrity verification. The battery 109 can be also utilized as a charge function as the mobile phone.

The computer device 110 is an external computer, and the reliability thereof is verified in the present invention. The computer device 110 includes an integrity measurement unit 111 measuring integrity upon receiving the request for integrity measurement from the communication terminal device 100. The result of the measurement is transmitted to the communication terminal device 100 via the connection cable and the like.

The server device 120 of the trusted third party is an external server and is used when verification of the result of integrity measurement is delegated to the third party in a modification (described later) of the present invention.

Next, using FIG. 2 illustrating the exterior of the communication terminal device 100 as an example, the pointing unit 101 is described in detail. The communication terminal device 100 includes a same function as that of the computer mouse and has a shape fit in a human hand. The example shown in FIG. 2 is based on a shape of a folding-type mobile phone, which has been popular in recent years, and includes the function as a mouse added. However, the communication terminal device 100 certainly does not need to be the folding type.

As shown in FIG. 2, in the communication terminal device 100 folded for use, two click buttons 201 for click operation are disposed on the top surface thereof while an optical sensor 202 is disposed on the bottom surface. The number of the click buttons 201 may be one. The communication terminal device 100 may further include a scroll wheel. Moreover, the optical sensor 202 may be a ball-type movement sensor.

The connection cable 203 connects the communication terminal device 100 and the computer device 110 and is implemented by a connector standard such as USB or PS/2. The communication terminal device 100 may be implemented as an infrared or radio wireless mouse not including the connection cable 203. The connection cable 203 is detachable and may be detached from the communication terminal device 100 when the communication terminal device 100 is not connected to the computer device 110.

The click buttons 201 are equivalent to normal mouse click buttons. By clicking the buttons, the user issues commands to the computer device 110 connected to the communication terminal device 100.

The optical sensor 202 includes light emitter and receiver and can optically read the amount, direction, and speed of movement. These data is transmitted to the computer device 110 via the connection cable 203 to specify movement of a cursor of the computer device 110.

(Reliability Verification Method)

Figure 3:
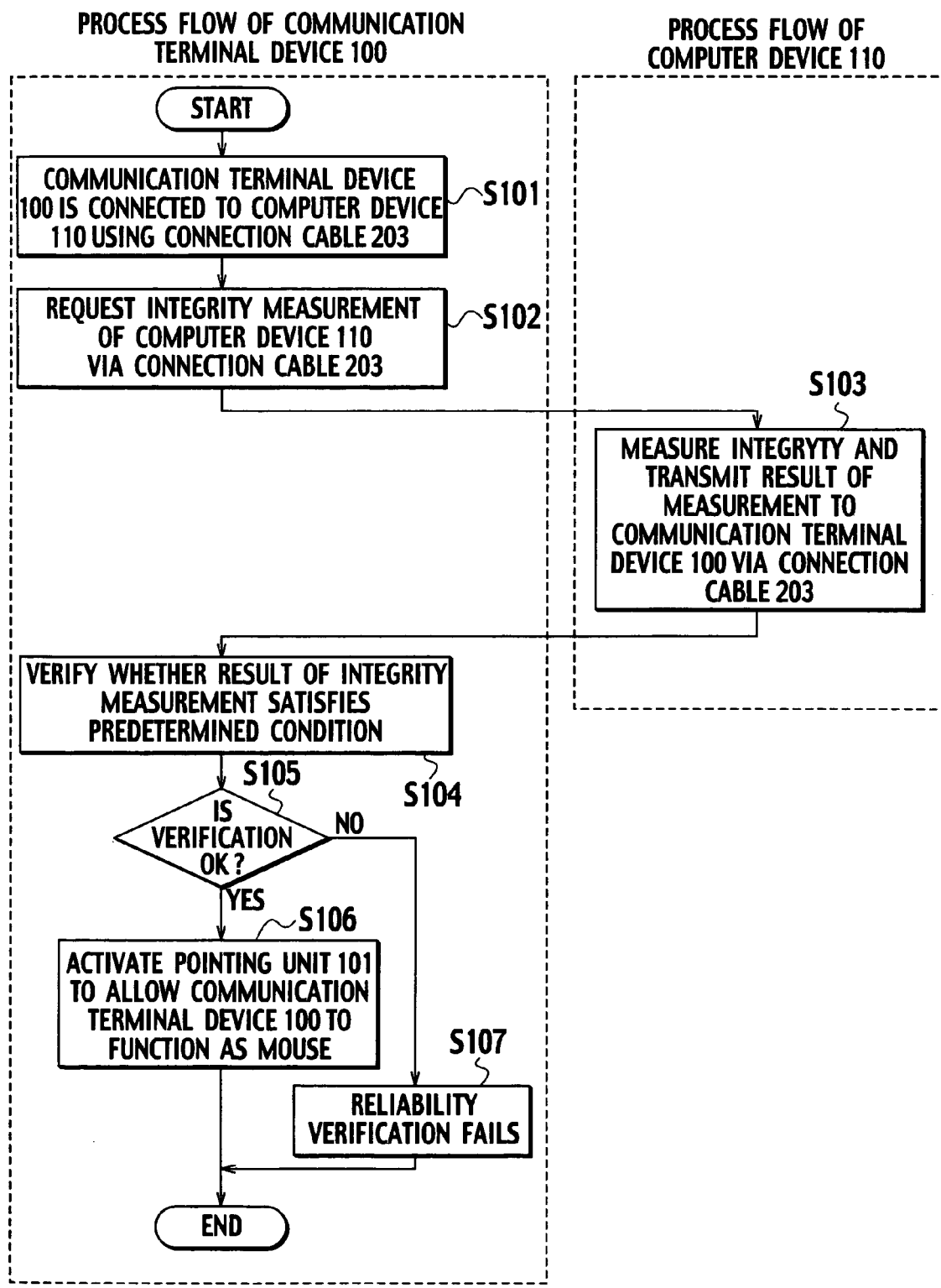
FIG. 3 is a flowchart (part 1) showing a reliability verification method according to the first embodiment.

Next, using FIG. 3, a description is given of an example of a process flow to verify reliability of the computer device 110 using the communication terminal device 100 which is trusted by the user. Herein, the user owns and always uses the communication terminal device 100 and can be convinced that the communication terminal device 100 is not tampered. The computer device 110 is someone else's, and the user does not always use the computer device 110 and cannot be convinced that any malicious software or hardware modules are not added to the computer device 110.

The communication terminal device 100 holds a public key in the memory unit 106 as a premise. The public key is paired with a private key held by the computer device 110 in a tamper resistant storage device (for example, Trusted Platform Module: TPM) inside. Moreover, the communication terminal device 100 is capable of surely identifying the communicating party which is an object of integrity verification as the computer device 110 using an existing cryptographic communication protocol.

First, in the step S101, the user connects the communication terminal device 100 and computer device 110 using the connection cable 203.

Next, in the step S102, the communication terminal device 100 requests the computer device 110 via the connection cable 203 to measure integrity. In the present invention, the protocol of the request for integrity measurement is not limited to a particular one but may be implemented by a method described in the publication "Trusted Computing Platforms: TCPA technology in context," Siani Pearson, et al, Published July 2002 by Prentice Hall PTR, ISBN 0-13-009220-7.

Next, in the step S103, upon receiving the request for integrity measurement, the computer device 110 measures the integrity and transmits a result of the integrity measurement to the communication terminal device 100 via the connection cable 203. This integrity measurement is implemented by, for example, a method described in the publication "Trusted Computing Platforms: TCPA technology in context," Siani Pearson, et al., Published July 2002 by Prentice Hall PTR, ISBN 0-13-009220-7.

Next, in the step S104, the communication terminal device 100 verifies whether the result of integrity measurement satisfies a predetermined condition, which is, for example, a condition that a boot process, an OS loader, and an OS of the computer device 110 are those as assumed or a condition that the computer configuration including a device driver and application software is that as assumed. Herein, if the computer device 110 includes malicious software or hardware, the result of integrity measurement does not satisfy the predetermined condition. Herein, the malicious software or hardware means software or hardware which steals user's inputted information or destroys data.

Next, in the step S105, the communication terminal device 100 judges the verification result of integrity. When the verification result is YES (in other words, the computer device 110 is reliable), the communication terminal device 100 proceeds to step S106, and when the verification result is No, the communication terminal device 100 proceeds to step S107.

In the step S106, the communication terminal device 100 activates the pointing unit 101 to function as a mouse of the computer device 110. The flow to verify the reliability of the computer is then terminated. The user notices that the communication terminal device 100 functions as a mouse of the computer device 110 to be convinced that the computer device 110 is reliable. The movement of the communication terminal device 100 as a mouse cannot be predicted by a malicious attacker, and the attacker cannot realize an attack causing the communication terminal device 100 to pretend to function as a mouse and thus falsifying the verification result of integrity.

On the other hand, in the step S107, since the computer device 110 is not reliable, the flow to verify the reliability of the computer is terminated without activating the pointing unit 101 of the communication terminal device 100. Herein, the user knows that the computer device 110 is not reliable because the cursor of the computer device 110 does not response to the movement of the communication terminal device 110 as a mouse. The user may use the computer device 110 with knowledge that the computer device 110 is not reliable (using a mouse supplied with the computer) or may stop using the computer terminal device 110.

(Operation and Effect)

According to the first embodiment, the user can go out without equipment other than a mobile phone (the communication terminal device 100) that the user usually carries and trust and use a (someone else's) computer at a place where the user goes. This is because the user can surely notice if the computer is not reliable. Moreover, checking the reliability does not require any special operations other than using the mobile phone as a mouse.

(Modification)

Figure 4:
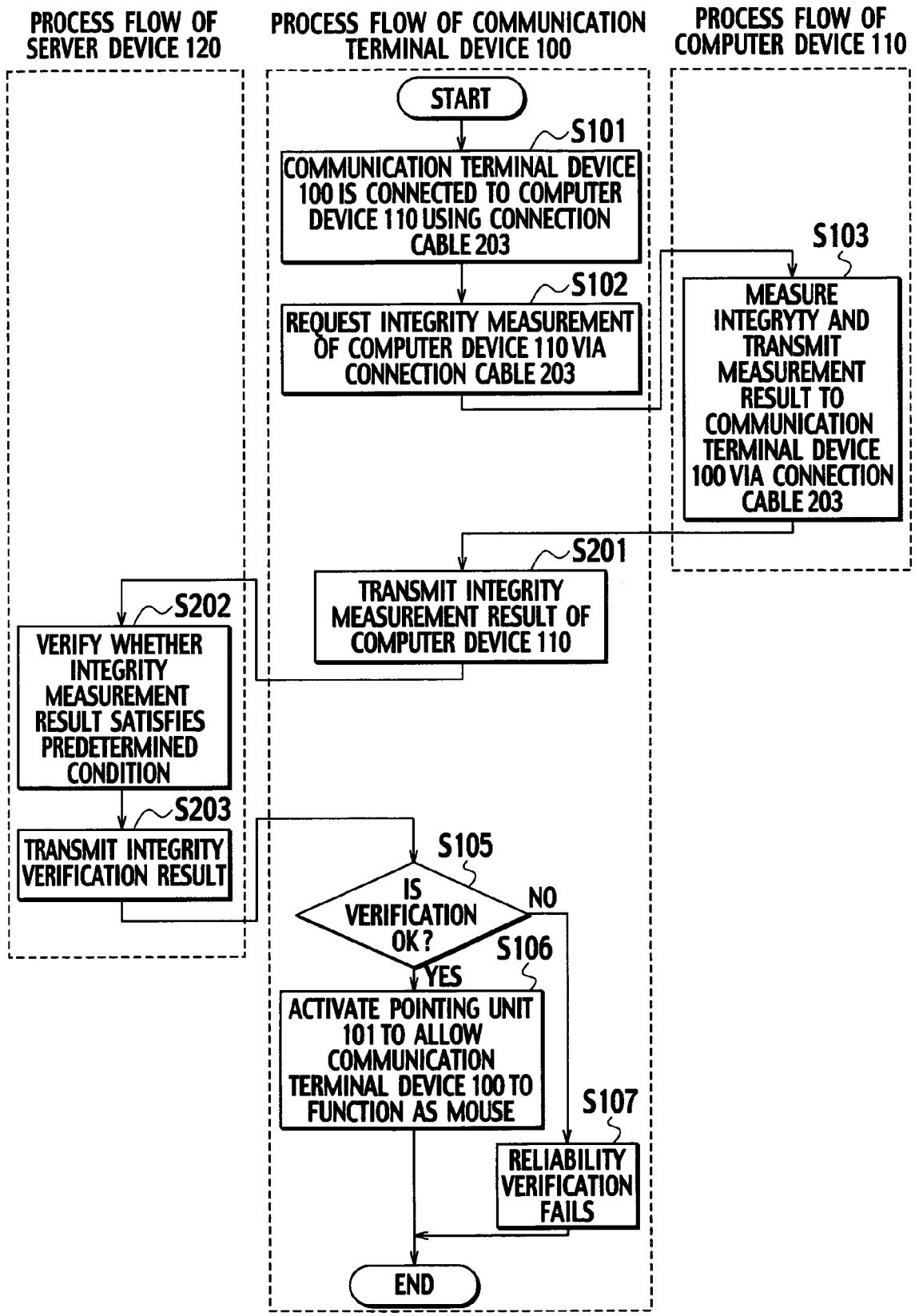
FIG. 4 is a flowchart (part 2) showing the reliability verification method according to the first embodiment.
Figure 5:
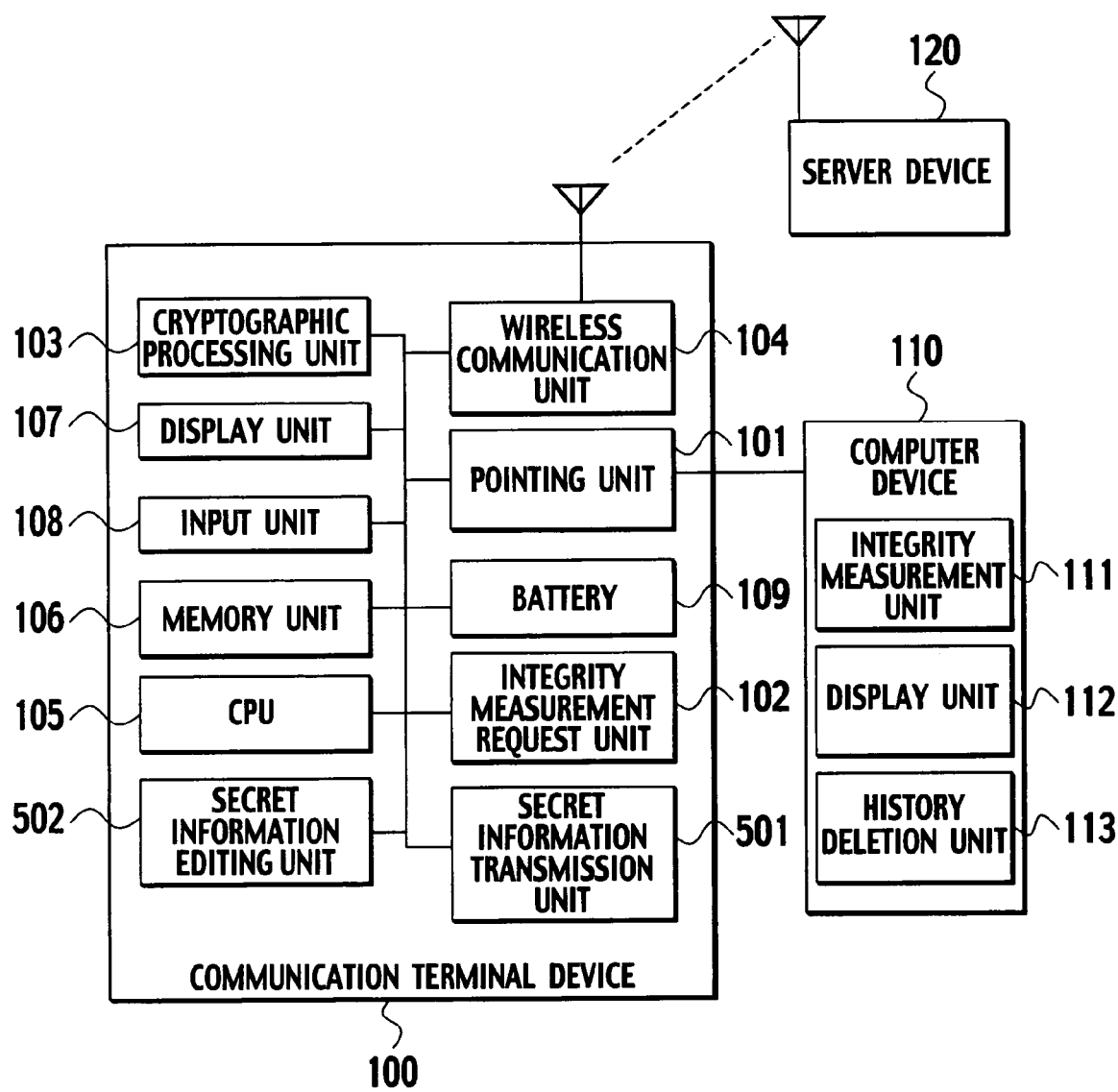
FIG. 5 is a block diagram of a communication system according to a second embodiment.

As a modification of the first embodiment, the server device 120 of a trusted third party (for example, a server operated by a mobile-service provider) is used, and the verification of the result of integrity measurement may be delegated to the server device 120. FIG. 4 is a chart showing an example of a process flow of this modification. This modification is described using FIG. 4. Steps of FIG. 4 same as those of FIG. 3 are as described above, and the description thereof is omitted.

The server device 120 holds a public key paired with a private key which the computer device 110 previously holds in a tamper resistant storage device (for example, TPM) inside and can identify the computer device 110 as the object of integrity measurement as a premise.

In this modification, the step S104 of FIG. 3 is substituted with steps S201, S202, and S203.

Specifically, in the step S201, the communication terminal device 100 transmits the result of integrity measurement received from the computer device 110 to the server device 120 using the wireless communication unit 104.

Next, in the step S202, the server device 120 verifies whether the result of integrity measurement satisfies the predetermined condition.

Next, in the step S203, the server device 120 transmits a result of the verification to the communication terminal device 100 via the wireless communication unit 104.

The communication terminal device 100 then performs the aforementioned processes of the steps S105 to S107.

According to this modification, the computer device 110 can be trusted for use even when the communication terminal device 100 does not previously hold the public key of the computer device 110. Moreover, delegating the verification of the result of integrity measurement to the server device 120 can save a calculation resource (a storage area for computation or verification conditions) of the communication terminal device 100.

As another modification, the integrity measurement may be substituted with virus check or update check for security patch files. In such a case, the communication terminal device 100 may specify a version of a virus definition file or a combination of the security patch files. This modification allows the verification whether the computer device 110 is reliable to be performed with a simpler method than the above method. This is because the computer device 110 does not need to include TPM. Noted that tampering of the computer configuration including an operating system cannot be detected.

As still another modification, the computer device 110, which is assumed to be a notebook PC provided with a pointing pad or buttons herein, may disable the pointing function of itself in the step S103. According to this modification, it is possible to avoid the risk of accidentally using the computer device 110 which is not reliable while the communication terminal device 100 is not used as a mouse but the pointing function of the computer device 110 is used instead.

Second Embodiment (Communication System)

A communication system according to a second embodiment includes the communication terminal device 100, computer device 110, and server device 120 of a trusted third party.

The communication terminal device 100 according to the second embodiment includes the pointing unit 101, the integrity measurement request unit 102, the cryptographic processing unit 103, the wireless communication unit 104, the CPU 105, the memory unit 106, the display unit 107, the input unit 108, battery 109, a secret information transmission unit 501, and a secret information editing unit 502.

The memory unit 106 previously stores secret information which only the user himself/herself of the communication terminal device 100 can know.

The secret information editing unit 502 edits the secret information. Details of the secret information editing unit 502 are described later.

The secret information transmission unit 501 transmits the secret information to the computer device 110 only when the verification result of integrity of the computer device 110 satisfies the predetermined condition.

Other units of the communication terminal device 100 are the same as those of the first embodiment, and the description thereof is omitted herein.

The computer device 110 includes the integrity measurement unit 111, a display unit 112, and a history deletion unit 113.

The display unit 112 displays the secret information transmitted from the communication terminal device 100. At this time, the user confirms that the secret information which only the user himself/herself can know is displayed and can trust the computer device 110.

The history deletion unit 113 restores various settings and data to the state before use (before logon or booting) when use of the computer device 110 is terminated (at logoff or when a shut down command is issued), or deletes history. The function to delete the history can be easily implemented with an existing technology. For example, a snapshot of various settings and data is stored before use, and various settings and data only should be replaced with the snapshot when the use is terminated. Deleting the history in this manner makes it possible to avoid the risk of operational history or the secret information (user's password, created documents, and the like) being stolen by another user after use.

The other units of the computer device 110 and the server device 120 are the same as those of the first embodiment, and the description thereof is omitted herein.

(Reliability Verification Method)

Figure 6:
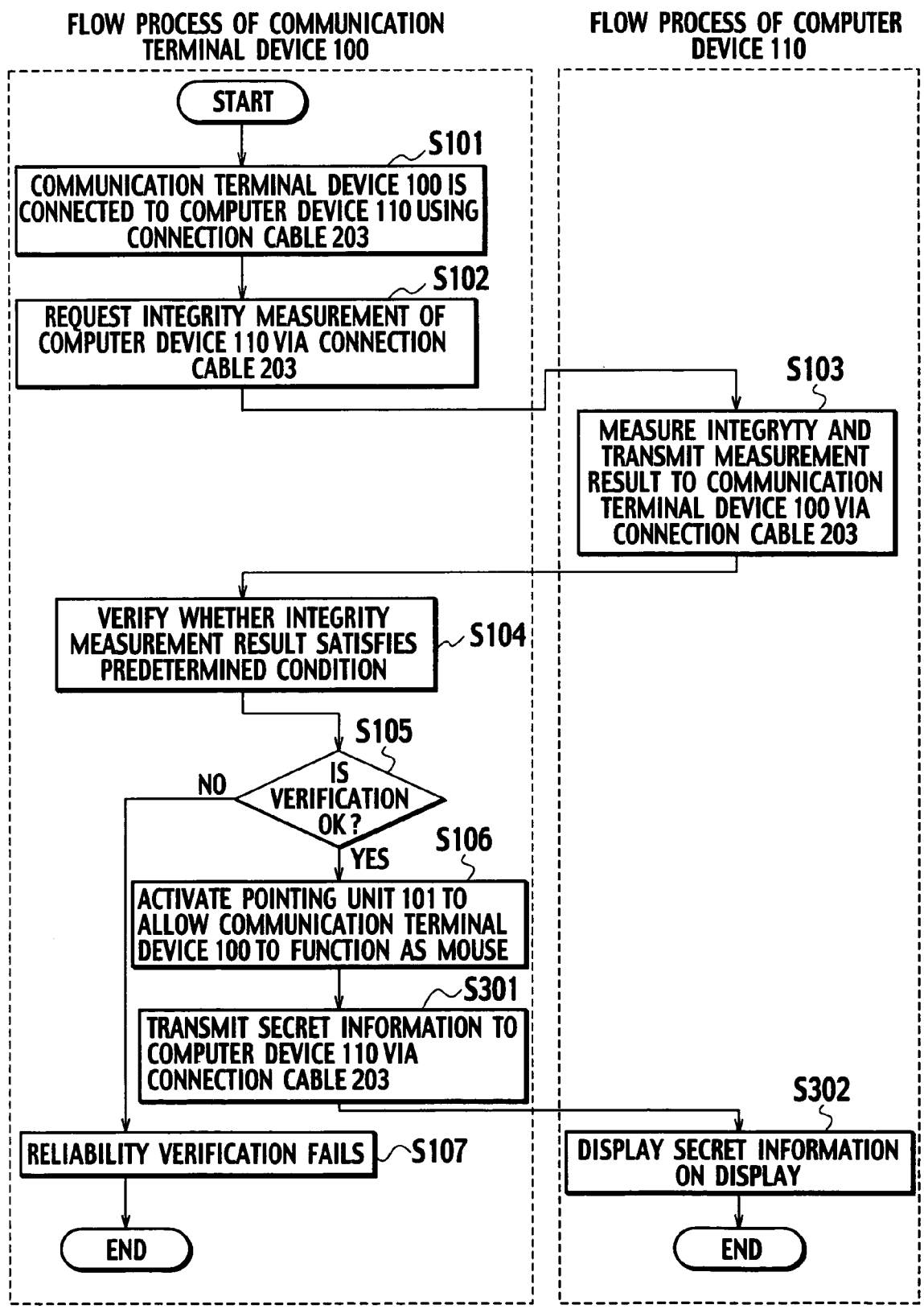
FIG. 6 is a flowchart showing a reliability verification method according to the second embodiment.

FIG. 6 is a chart showing an example of a process flow according to the second embodiment. This embodiment is described in more detail using FIG. 6. Steps of FIG. 6 same as those of FIG. 3 are as described above, and the description thereof is omitted.

The memory unit 106 of the communication terminal device 100 previously stores arbitrary secret information which only the user can know as a premise. The secret information may be, for example, an arbitrary color, string, or image. The secret information may include a plurality of items. Furthermore, the secret information may be classified into two types: one is used when the verification result of integrity satisfies the predetermined condition, and the other is used when the verification result of integrity does not satisfy the same (use of the latter is described later). Herein, it may be designed that the user can register favorite secret information or change the same using the secret information editing unit 502. The secret information editing unit 502 may be implemented by the display unit 107 and input unit 108 configured to include the editing function. For example, an arbitrary string is inputted and registered with a keypad (the secret information editing unit 502) while a liquid crystal display (the display unit 107) is being checked. Moreover, the secret information editing unit 502 may be implemented by an editing program stored in the memory unit 107 and processed with the CPU 105. Furthermore, the secret information editing unit 502 may be implemented by using a camera function, which has been popular in mobile phones in recent years, allowing an arbitrary image shot by the user to be registered as the secret information. Furthermore, favorite information (for example, an image) may be downloaded from an arbitrary server (a WEB site) in a network using the wireless communication unit 104 and registered as the secret information.

In the second embodiment, processes of steps S301 and S302 are added after the step S106 of FIG. 3.

In the step S106, the communication terminal device 100 activates the pointing unit 101 to function as a mouse of the computer device 110. Immediately thereafter (simultaneously or immediately before that), in the step S301, the communication terminal device transmits the secret information to the computer device 110 via the connection cable 203 using the secret information transmission unit 501.

The secret information transmission unit 501 performs management including selecting the secret information to be transmitted according to the verification result of integrity, which is, for example, described as a program and processed by the CPU 105.

Next, in the step S302, the computer device 110 displays the received secret information in the display and terminates the process. For example, when the secret information indicates that cursor color is green, a cursor in the display of the computer device 110, which is operated by the pointing unit 101 of the communication terminal device 100, is displayed in green.

(Operation and Effect)

In the second embodiment, the received secret information is displayed in the display of the computer device 110, so that the user can more explicitly know that the computer device 110 is reliable. In the first embodiment, the user can know the same by the communication terminal device 100 functioning as a mouse, which is adequate. However, additionally displaying the secret information enhances user's feeling of security. This is effective especially on, when the communication terminal device 100 includes a function to turn off the function to verify integrity and can be used as just a mouse, avoiding the risk of accidentally trusting and using the computer device 110 while the function to verify integrity is turned off.

(Modification)

The aforementioned secret information transmission unit 501 performs the management including selection of secret information to be transmitted according to the verification result of integrity. However, as a modification, the secret information transmission unit 501 may perform the management so as to prevent that the secret information transmitted in the past is repeatedly used. Herein, the number of times that the same secret information is permitted to be used may be set to an arbitrary value. Alternatively, setting may be made so that the same secret information is prevented from being repeatedly used for the same computer device 110. Moreover, the secret information currently used may be displayed in the display unit 107 of the communication terminal device 100 to allow the user to know whether the secret information displayed in the communication terminal device 110 is the same as what is displayed in the display of the computer device 110.

The secret information once used is stored in the computer device 110 and can be stolen by a (malicious) third party. Moreover, the secret information displayed in the display can be stolen by prying eyes of a third party. According to this modification, even if the secret information is stolen by a third party, different secret information is used next time, thus further enhancing the security.

Third Embodiment (Communication System)

Figure 7:
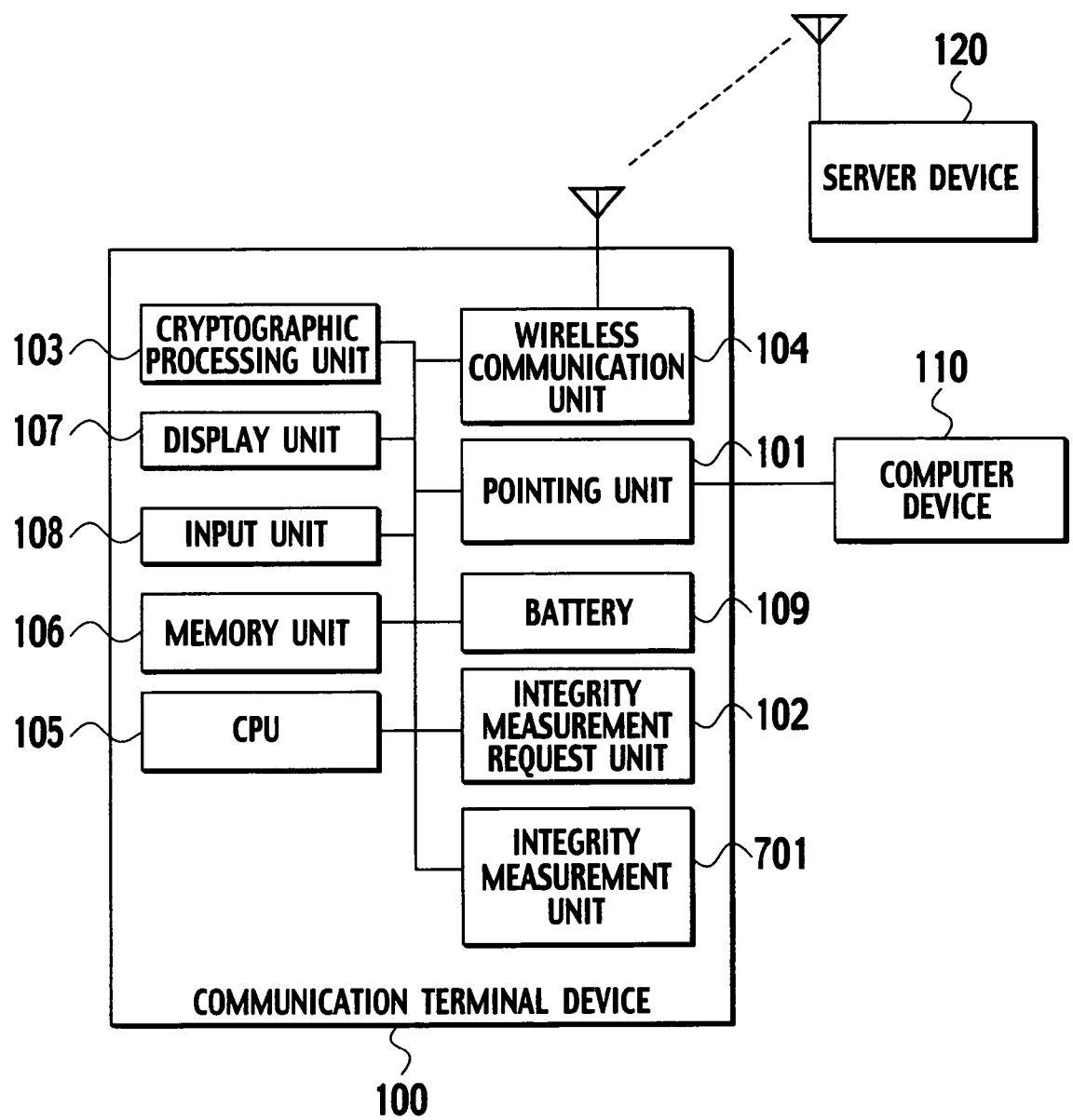
FIG. 7 is a block diagram of a communication system according to a third embodiment.

A communication system according to a third embodiment includes the communication terminal device 100, computer device 110, and server device 120 of a trusted third party as shown in FIG. 7.

The communication terminal device 100 according to the third embodiment includes the pointing unit 101, the integrity measurement request unit 102, the cryptographic processing unit 103, the wireless communication unit 104, the CPU 105, the memory unit 106, the display unit 107, the input unit 108, the battery 109, and an integrity measurement unit 701.

The integrity measurement unit 701 can be implemented by an existing method and functions by, for example, using a TPM (see "Trusted Computing Platforms: TCPA technology in context"), which is tamper resistant.

The other units of the communication terminal device 100, the computer device 110, and the server device 120 are the same as those of the first embodiment, and the description thereof is omitted.

(Reliability Verification Method)

In the third embodiment, as a preparation for starting the flow of FIG. 3, first, the user issues a command to measure integrity of the communication terminal device 100 itself using the input unit 108 of the communication terminal device 100. Upon receiving this command, the communication terminal device 100 measures the integrity of itself, encrypts the result of integrity measurement using a secret key stored in the TPM, and transmits the same to the server device 120. Herein, the server device 120, which is operated by, for example, a mobile phone service provider, can identify the communication terminal device 100 and holds a public key corresponding to the private key. The server device 120 verifies the result of integrity measurement using the public key corresponding to the private key, stores the verification result in the server device 120 (or another server), and transmits a network address (for example, URL) of the same to the communication terminal device 100. The user accesses the network address using the wireless communication unit 104 of the communication terminal device 100 to know the verification result. When the verification result satisfies a predetermined condition, the communication terminal device 100 is reliable, and the flow of FIG. 3 is started.

(Operation and Effect)

The first and second embodiments are on the premise that the communication terminal device 100 is reliable. In the third embodiment, the reliability of the computer device 100 can be verified after the user is convinced that the communication terminal device 100 is reliable, thus further enhancing the security.

Fourth Embodiment (Communication System)

A communication system according to a fourth embodiment includes the communication terminal device 100, computer device 110, and server device 120 of a trusted third party as shown in FIG. 8.

The communication terminal device 100 according to the fourth embodiment includes the pointing unit 101, the integrity measurement request unit 102, the cryptographic processing unit 103, the wireless communication unit 104, the CPU 105, the memory unit 106, the display unit 107, the input unit 108, the battery 109, and an integrity verification result display unit 801.

The integrity verification result display unit 801 is implemented by a LED or liquid crystal display and displays the result of integrity verification.

The other units of the communication terminal device 100, the computer device 110, and the server device 120 are the same as those of the first embodiment, and the description thereof is omitted.

Figure 9A:
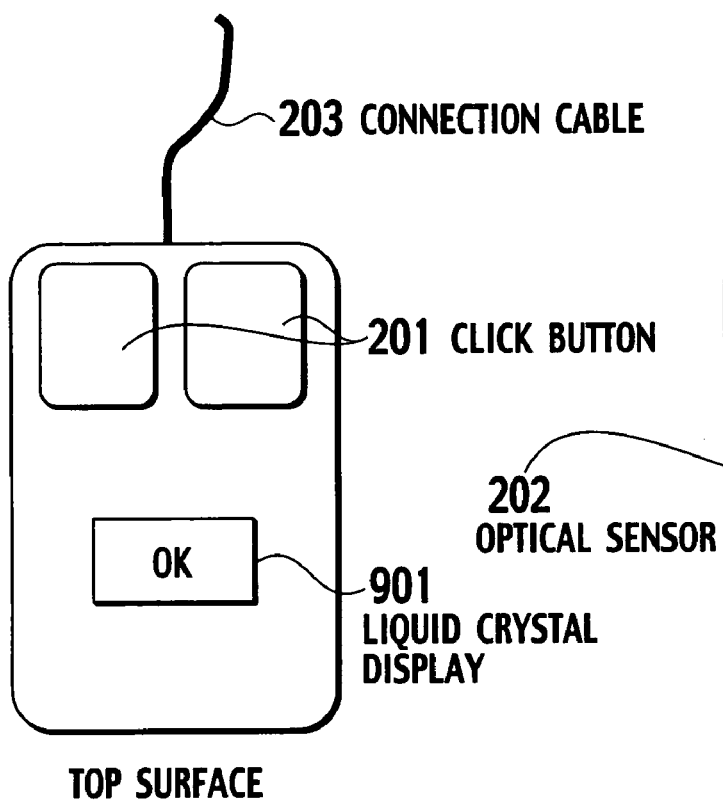
FIGS. 9A, 9B and 9C are an external view of a pointing unit according to the fourth embodiment.
Figure 9B:
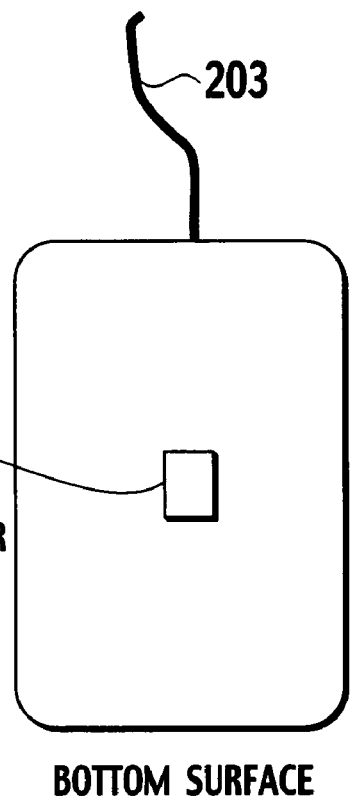
Figure 9C:
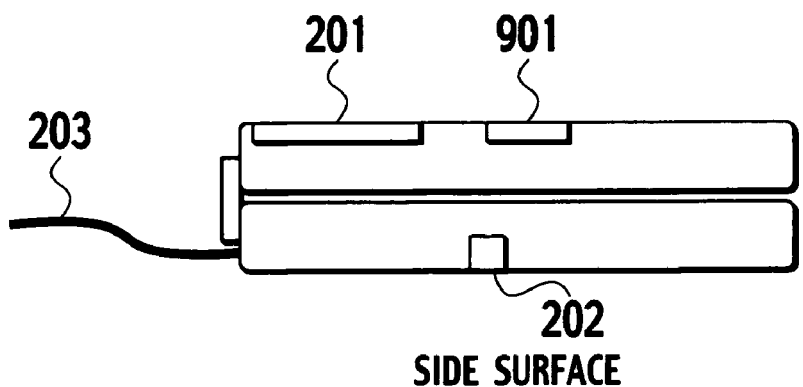

FIG. 9 is a view showing an example of the exterior of the communication terminal device 100 according to the fourth embodiment. The usability of the communication terminal device 100 is improved if a liquid crystal display 901 (=the integrity verification result display unit 801) is disposed, as shown in the drawing, on the top surface of the communication terminal device 100 used as a mouse. However, the liquid crystal display 901 certainly may be disposed at a different place. Moreover, the display (=the display unit 107) as a mobile phone may serve the function of the integrity verification result display unit 801.

(Reliability Verification Method)

Figure 10:
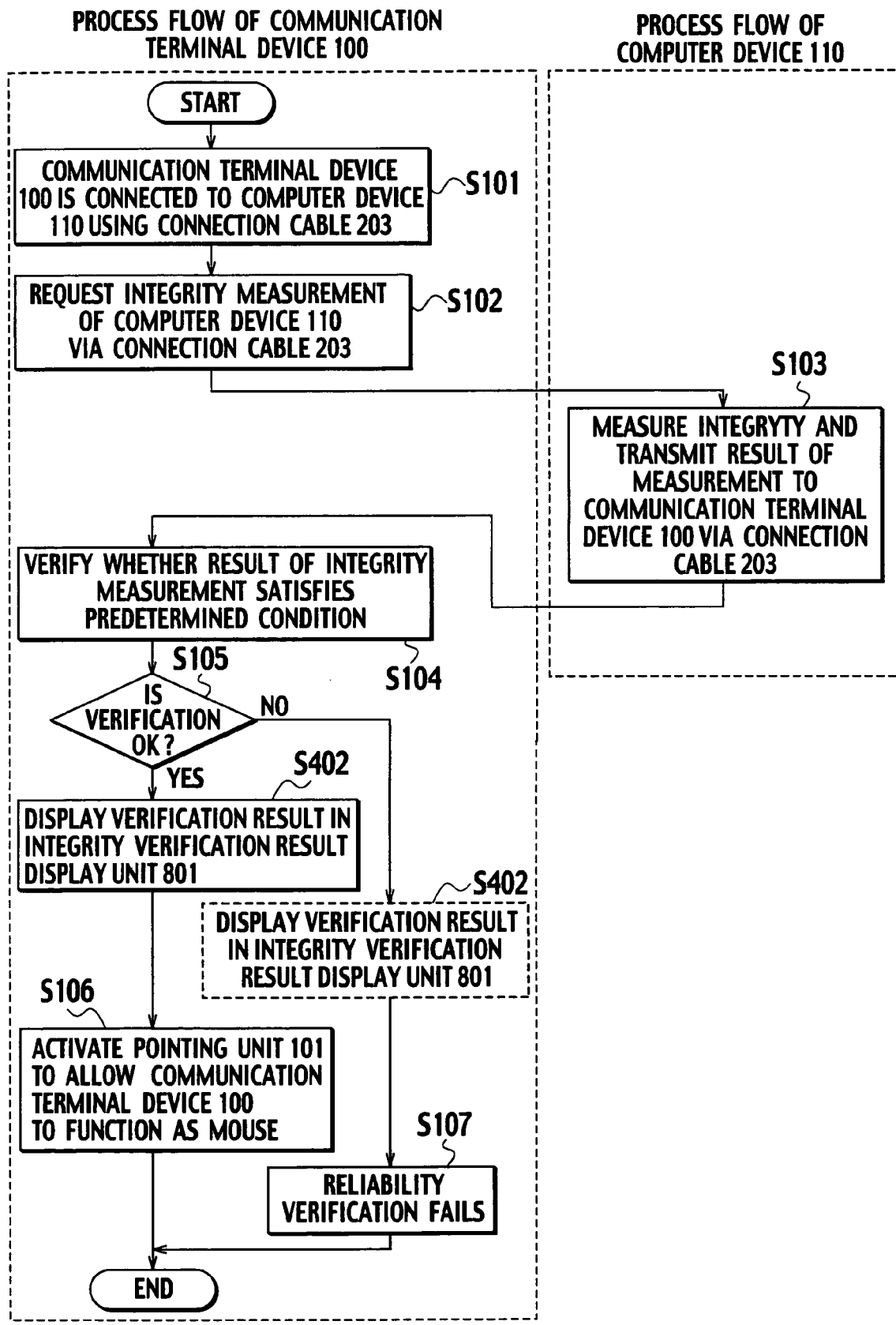
FIG. 10 is a flowchart showing a reliability verification method according to the fourth embodiment.

FIG. 10 is a chart showing an example of a process flow according to the fourth embodiment. This embodiment is described in more detail using FIG. 10. Steps of FIG. 10 same as those of FIG. 3 are as described above, and the description thereof is omitted.

When the result of the verification of the step S105 is YES, the successful verification result is displayed in the integrity verification result display unit 801 in the step S401, and then the communication terminal device 100 proceeds to the step S106 (an example of display is OK of FIG. 9).

On the other hand, when the result of the verification of the step S105 is NO, the failed verification result is displayed in the integrity verification result display unit 801 in the step S402, and then the communication terminal device 100 proceeds to the step S107 (an example of display is NO instead of OK in FIG. 9). Noted that the step S402 may be omitted.

(Operation and Effect)

In the fourth embodiment, the user can doubly confirm that the communication terminal device 100 is reliable not only with the mouse function but also with the integrity verification result display unit 801 of the communication terminal device 100, further enhancing the reliability. As described in the first to third embodiments, the user can know the same by the communication terminal device 100 functioning as a mouse, which is adequate. However, additionally displaying the verification result in the reliable communication terminal device 100 enhances user's feeling of security. This is effective especially on, when the communication terminal device 100 includes a function to turn off the function to verify integrity and can be used as just a mouse, avoiding the risk of accidentally trusting and using the computer device 110 while the function to verify integrity is turned off.

Fifth Embodiment (Communication System)

Figure 11:
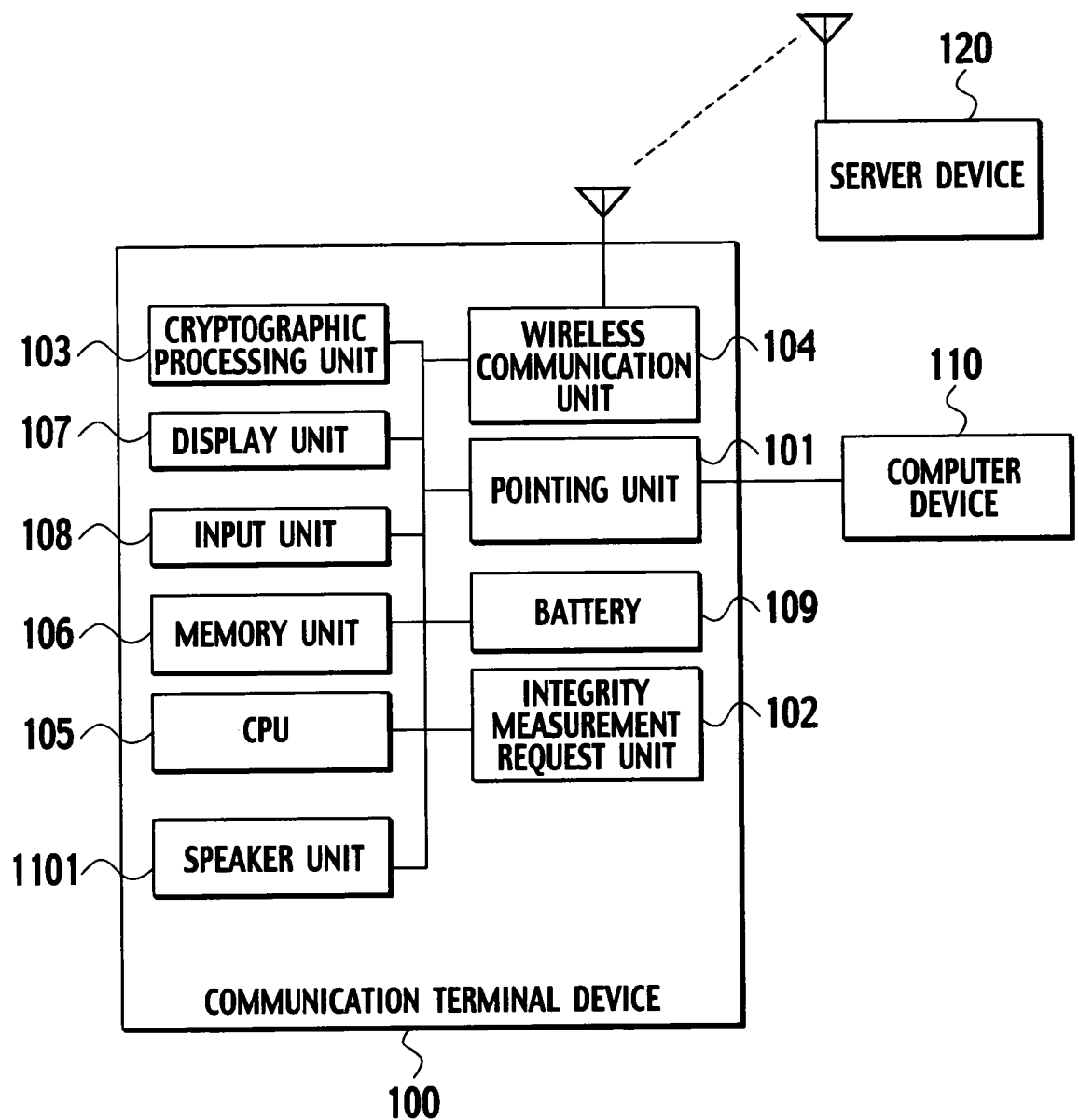
FIG. 11 is a block diagram of a communication system of a fifth embodiment.

A communication system according to a fifth embodiment includes the communication terminal device 100, the computer device 110, and the server device 120 of a trusted third party as shown in FIG. 11.

The communication terminal device 100 according to the fifth embodiment includes the pointing unit 101, the integrity measurement request unit 102, the cryptographic processing unit 103, the wireless communication unit 104, the CPU 105, the memory unit 106, the display unit 107, the input unit 108, the battery 109, and a speaker unit 1101.

The speaker unit 1101 is an existing speaker, and the function thereof may be assigned to a speaker as the mobile phone.

The speaker unit 1101 includes a function to represent the result of integrity measurement by sound.

The other units of the communication terminal device 100, the computer device 110, and the server device 120 are the same as those of the first embodiment, and the description thereof is omitted.

(Reliability Verification Method)

The fifth embodiment can be implemented by replacing "DISPLAY VERIFICATION RESULT" in the step S401 of FIG. 10 with "REPRESENT VERIFICATION RESULT BY SOUND (a sound previously determined for representation of a success)". Similarly, "DISPLAY VERIFICATION RESULT" in the step S402 is replaced with "REPRESENT VERIFICATION RESULT BY SOUND (a sound previously determined for representation of a failure)".

(Operation and Effect)

In the fifth embodiment, the user can doubly confirm that the communication terminal device 100 is reliable not only by the mouse function but also by the sound from the speaker unit 1101 of the communication terminal device 100, thus further enhancing the reliability. As described in the first to third embodiments, the user can know the same by the communication terminal device 100 functioning as a mouse, which is adequate. However, additionally representing the verification result by sound in the reliable communication terminal device 100 enhances user's feeling of security. This is effective especially on, when the communication terminal device 100 includes the function to turn off the function to verify integrity and can be used as just a mouse, avoiding the risk of accidentally trusting and using the computer device 110 while the function to verify integrity is turned off.

Sixth Embodiment (Communication System)

Figure 12:
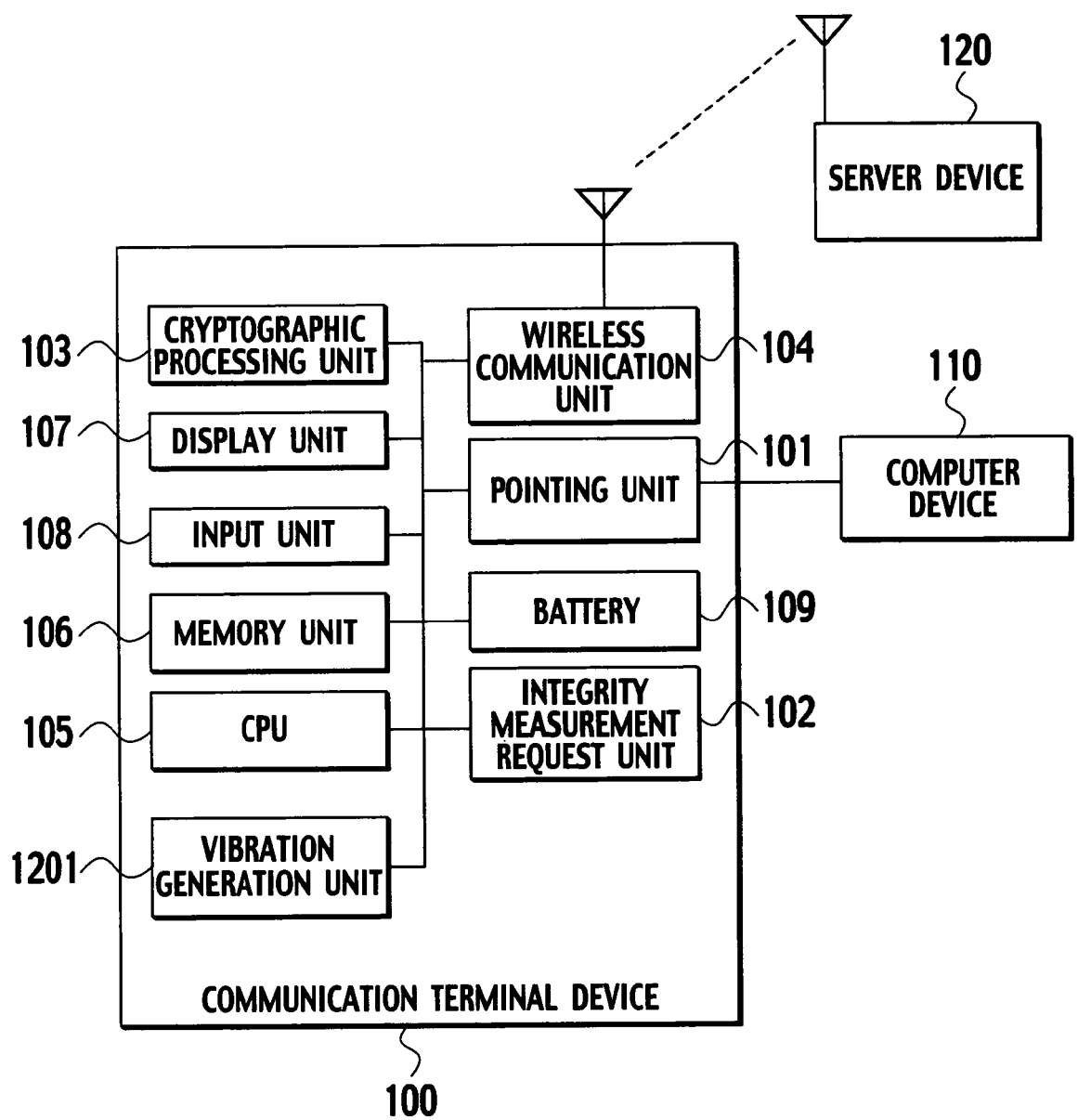
FIG. 12 is a block diagram of a communication system of a sixth embodiment.

A communication system according to a sixth embodiment includes the communication terminal device 100, computer device 110, and server device 120 of a trusted third party as shown in FIG. 12.

The communication terminal device 100 according to the sixth embodiment includes the pointing unit 101, the integrity measurement request unit 102, the cryptographic processing unit 103, the wireless communication unit 104, the CPU 105, the memory unit 106, the display unit 107, the input unit 108, the battery 109, and a vibration generation unit 1201.

The vibration generation unit 1201 is an existing vibration generator, and a function thereof may be assigned to a vibration generator as the mobile phone. The vibration generation unit 1201 includes a function to represent the result of integrity measurement by vibration.

The other units of the communication terminal device 100, the computer device 110, and the server device 120 are the same as those of the first embodiment, and the description thereof is omitted.

(Reliability Verification Method)

The sixth embodiment can be implemented by replacing the "DISPLAY VERIFICATION RESULT" in the step S401 of FIG. 10 with "REPRESENT VERIFICATION RESULT BY VIBRATION (a vibration pattern previously determined for representation of a success)". Similarly, "DISPLAY VERIFICATION RESULT" in the step S402 is replaced with "REPRESENT VERIFICATION RESULT BY VIBRATION (a vibration pattern previously determined for representation of a failure)".

(Operation and Effect)

In the sixth embodiment, the user can doubly confirm that the communication terminal device 100 is reliable not only by the mouse function but also by the vibration from the vibration generation unit 1201 of the communication terminal device 100, thus further enhancing the reliability. As described in the first to third embodiments, the user can know the same by the communication terminal device 100 functioning as a mouse, which is adequate. However, additionally representing the verification result by vibration in the reliable communication terminal device 100 enhances user's feeling of security. This is effective especially on, when the communication terminal device 100 includes the function to turn off the function to verify integrity and can be used as just a mouse, avoiding the risk of accidentally trusting and using the computer device 110 while the function to verify integrity is turned off.

Seventh Embodiment (Communication System)

A communication system according to a seventh embodiment includes the communication terminal device 100, computer device 110, and server device 120 of a trusted third party as shown in FIG. 1. The communication terminal device 100, the computer device 110, and the server device 120 are the same as those of the first embodiment, and the description thereof is omitted herein.

(Reliability Verification Method)

In the seventh embodiment, a description is given of another method to continuously verifying the reliability of the computer device 110.

Figure 13:
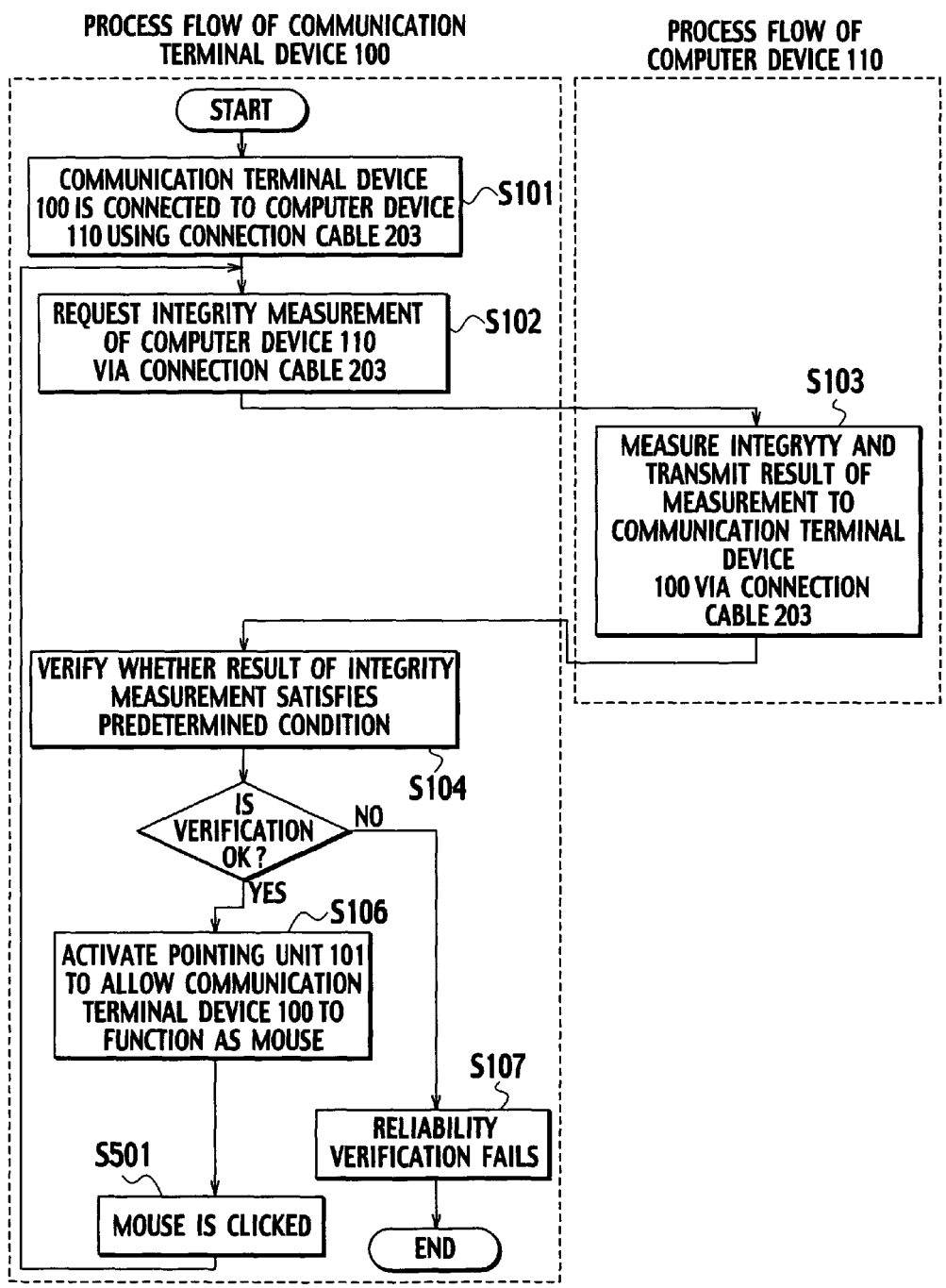
FIG. 13 is a flowchart showing a reliability verification method according to a seventh embodiment.

FIG. 13 is a chart showing an example of a process flow of this embodiment. Steps of FIG. 13 same as those of FIG. 3 are as described above, and the description thereof is omitted herein.

In the step S106 of FIG. 13, the communication terminal device 100 activates the pointing unit to function as a mouse of the computer device 110.

Next, in the step S501, when the user clicks the click buttons 201 of the mouse, the communication terminal device 100 returns to the step S102 and repeats the subsequent steps. The flow of FIG. 13 is not terminated while the computer device 110 remains reliable.

(Operation and Effect)

Even when the reliability of the computer device 110 can be verified at the beginning of use, the reliability can be reduced during the use by virus infection, attack from another computer device, or the like in some cases. However, such a case can be detected with the seventh embodiment, thus enhancing the security. Herein, the trigger to measure integrity is set to a mouse click because the mouse click corresponds to an important command (for example, execution of electronic commerce or execution of a new program) in many applications. Verifying the reliability of the computer device 110 when such a command is issued is effective. It is no good if the reduction in reliability is turned out after the command is issued. However, the program may be designed so that, when an important command is issued, the command (=mouse click) is required to be issued again for confirmation, which can prevent an accident. Specifically, the communication terminal device 100 proceeds to the step S107 before the command is issued again for confirmation, and the pointing unit 101 of the communication terminal device 100 is deactivated. Herein, the trigger to measure integrity is not limited to clicking the left click button.

(Modification)

As a modification, the trigger is not set to clicking the mouse, and the computer device 110 is automatically returned to the step S102 at predetermined intervals. Moreover, the step S107 may be modified as follows. The communication terminal device 100 transmits the secret information indicating failed verification to the computer device 110 via the connection cable 203 using the secret information transmission unit 501, and the computer device 110 displays the secret information in the display, thus terminating the flow.

Eighth Embodiment (Communication System)

Figure 14:
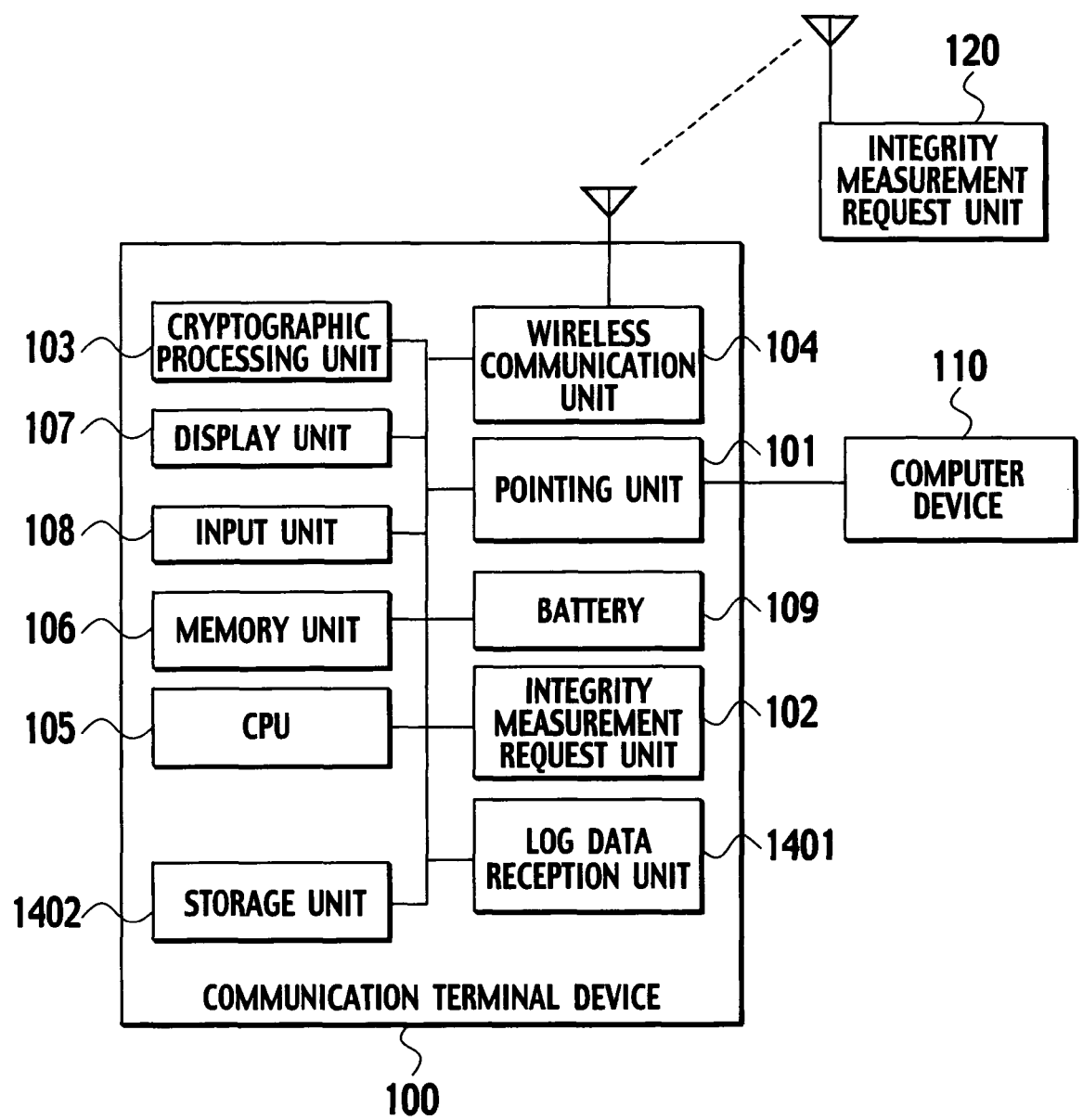
FIG. 14 is a block diagram of a communication system according to an eighth embodiment.

A communication system according to an eighth embodiment includes the communication terminal device 100, computer device 110, and server device 120 of a trusted third party as shown in FIG. 14.

The communication terminal device 100 according to the eighth embodiment includes the pointing unit 101, the integrity measurement request unit 102, the cryptographic processing unit 103, the wireless communication unit 104, the CPU 105, the memory unit 106, the display unit 107, the input unit 108, the battery 109, a log data reception unit 1401, and a storage unit 1402.

The log data reception unit 1401 receives log data (an operation log, an execution log, and the like) of the computer device 110 via the connection cable 203.

The storage unit 1402 may be implemented in such a manner that the function thereof is assigned to the memory unit 106 or implemented by a dedicated storage unit such as a flash memory or a hard disk. The storage unit 1402 stores the log data obtained by the log data reception unit 1401.

The log data is used when history of operations performed in the computer device 110 needs to be verified later. For example, when a customer points out that an electronic commerce transaction has not been conducted although the electronic commerce transaction has been really conducted, the log data is utilized as an evidence of the execution. The transmission of the log data may be executed when the use of the computer device 110 is terminated (at logoff or when the shut down command is issued) or may be repeated at predetermined intervals (only a part of the log added may be transmitted), repeated when an amount of the log data reaches a predetermined value (only a part of the log added may be transmitted).

This embodiment may be modified to transmit the log data stored in the storage unit 1402 to the server device 120 via the wireless communication unit 104. This modification allows the server, which has enough resources as a computer, to analyze the log and audit whether proper executions have been carried out in the computer device 110.

The other units of the communication terminal device 100, the computer device 110, and the server device 120 are the same as those of the first embodiment, and the description thereof is omitted.

(Operation and Effect)

According to the eighth embodiment, the history of operations executed in the computer device 110 can be verified later.

Ninth Embodiment (Communication System)

A communication system according to a ninth embodiment includes the communication terminal device 100, computer device 110, and server device 120 of a trusted third party as shown in FIG. 1.

In the ninth embodiment, the pointing unit 101 of the communication terminal 100 is substituted with a key input unit. The key input unit includes an operation function equivalent to a keyboard of the computer device 110. When the result of integrity measurement satisfies the predetermined condition, the key input unit acquires key information.

The other units of the communication terminal device 100, the computer device 110, and the server device 120 are the same as those of the first embodiment, and the description thereof is omitted.

(Reliability Verification Method)

In the ninth embodiment, "ACTIVATE POINTING UNIT TO ALLOW COMMUNICATION TERMINAL DEVICE 100 TO FUNCTION AS MOUSE" in the step S106 of FIG. 3 is replaced with "ACTIVATE KEY INPUT UNIT TO ALLOW THE COMMUNICATION TERMINAL DEVICE 100 TO FUNCTION AS COMPUTER KEYBOARD (via the connection cable 203)".

(Operation and Effect)

According to the ninth embodiment, similar to the first embodiment, the user can go out without equipment other than the mobile phone (the communication terminal device 100) which the user usually carries and can trust and use a (someone else's) computer at a place where the user goes. This is because the user can surely know that the computer is not reliable.

Tenth Embodiment (Communication System)

Figure 15:
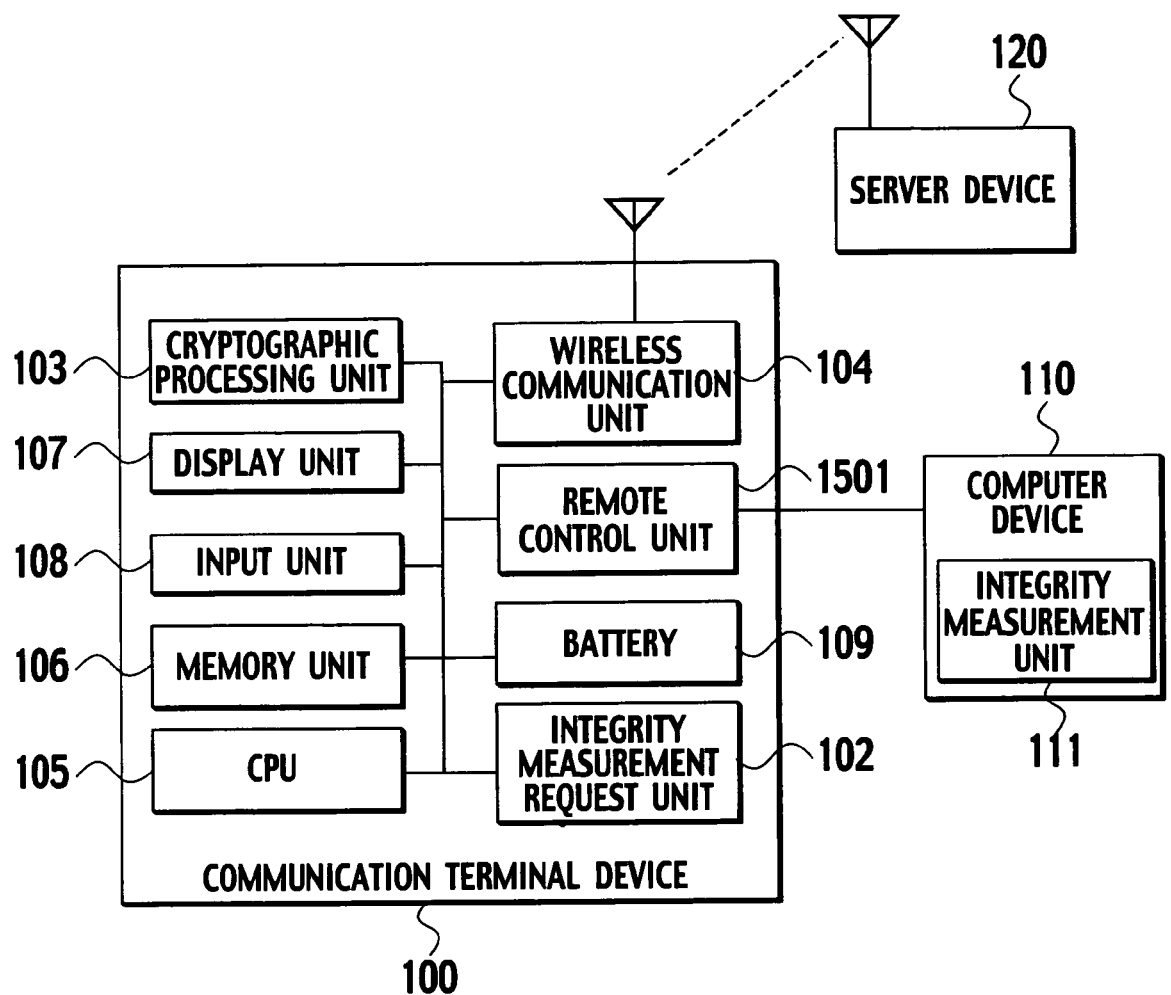
FIG. 15 is a block diagram of a communication system according to a tenth embodiment.

A communication system according to a tenth embodiment includes the communication terminal device 100, computer device 110, and server device 120 of a trusted third party as shown in FIG. 15.

In the tenth embodiment, a remote control unit 1501 is provided instead of the pointing unit 101 of the communication terminal 100 of the first embodiment.

The remote control unit 1501 includes an operation function equivalent to a remote controller of the computer device 110. When the result of integrity measurement satisfies the predetermined condition, the remote control unit 1501 acquires remote control information (from the user) and enables a function of remote control. When the result of integrity measurement does not satisfy the predetermined condition, the remote control unit 1501 disables a part of the function of remote control.

Herein, the remote controller indicates portable equipment to remotely operate entertainment equipment using a computer (such as game, audio, or video equipment). As such portable equipment, information on product examples is shown in "Media Center PC Features (http://www.microsoft.com/windowsxp/mediacenter/evaluation/features.mspx"). The remote controller and computer device 110 may communicate with each other via wired or wireless connections.

The other units of the communication terminal device 100, the computer device 110, and the server device 120 are the same as those of the first embodiment, and the description thereof is omitted. The computer device 110 is not limited to a personal computer and may be any device having a CPU such as a media server, game equipment, DVD reproduction/recording equipment, or audio equipment).

(Reliability Verification Method)

Figure 16:
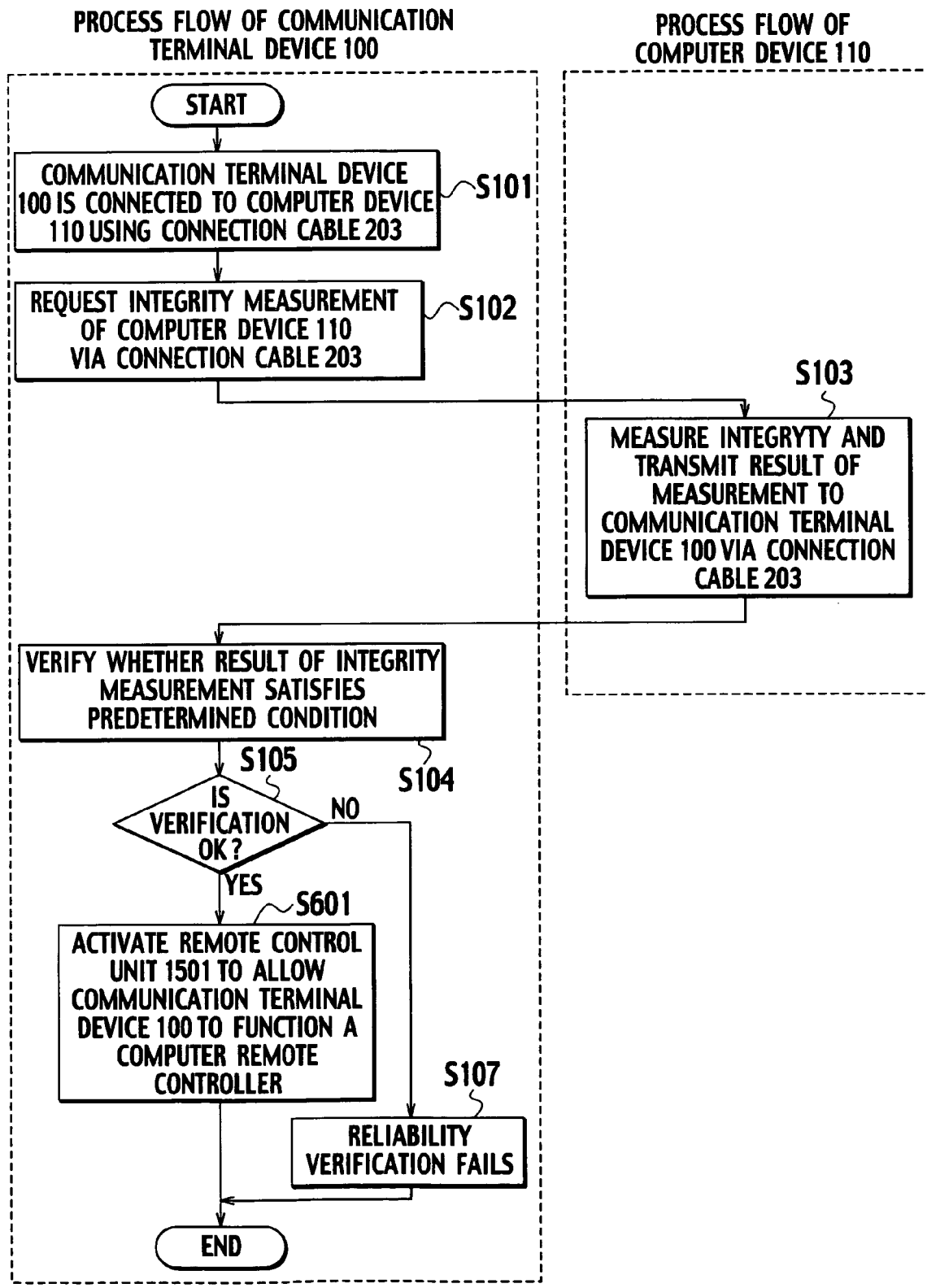
FIG. 16 is a flowchart showing a reliability verification system according to the tenth embodiment.

FIG. 16 is a chart showing an example of a process flow according to the tenth embodiment. This embodiment is described in more detail using FIG. 16. Steps of FIG. 16 same as those of FIG. 3 are as described above, and the description thereof is omitted herein.

In the step S601 of FIG. 16, the communication terminal device 100 activates the remote control unit 1501 to function as a computer remote controller.

(Modification)

As a modification thereof, the integrity measurement may be substituted with a (specific) content copyright protection specification situation of the computer device 110. For example, a device supporting Content Protection for Recordable Media (CPRM) (corresponding to the computer device 110) holds a unique device key. The integrity verification in the step S104 of FIG. 3 is to verify whether the device key is currently available and proper.

(Operation and Effect)

According to the tenth embodiment, similar to the first embodiment, the user can trust another computer for use by means of a mobile phone (the communication terminal device1 100) which the user usually carries. This is because the user can surely know that the computer is not reliable. Moreover, when the result of integrity measurement dose not satisfy the predetermined condition, the remote control unit 1501 disables a part of the function of remote control, thus preventing communication with the computer device 110 which is not reliable.

Moreover, according to the modification, it is possible to prevent a device not compliant with the specification for content copyright protection from being accidentally used.

Eleventh Embodiment (Communication System)

A communication system according to the eleventh embodiment is the same as that of the tenth embodiment shown in FIG. 15, and the description thereof is omitted.

(Reliability Verification Method)

Figure 17:
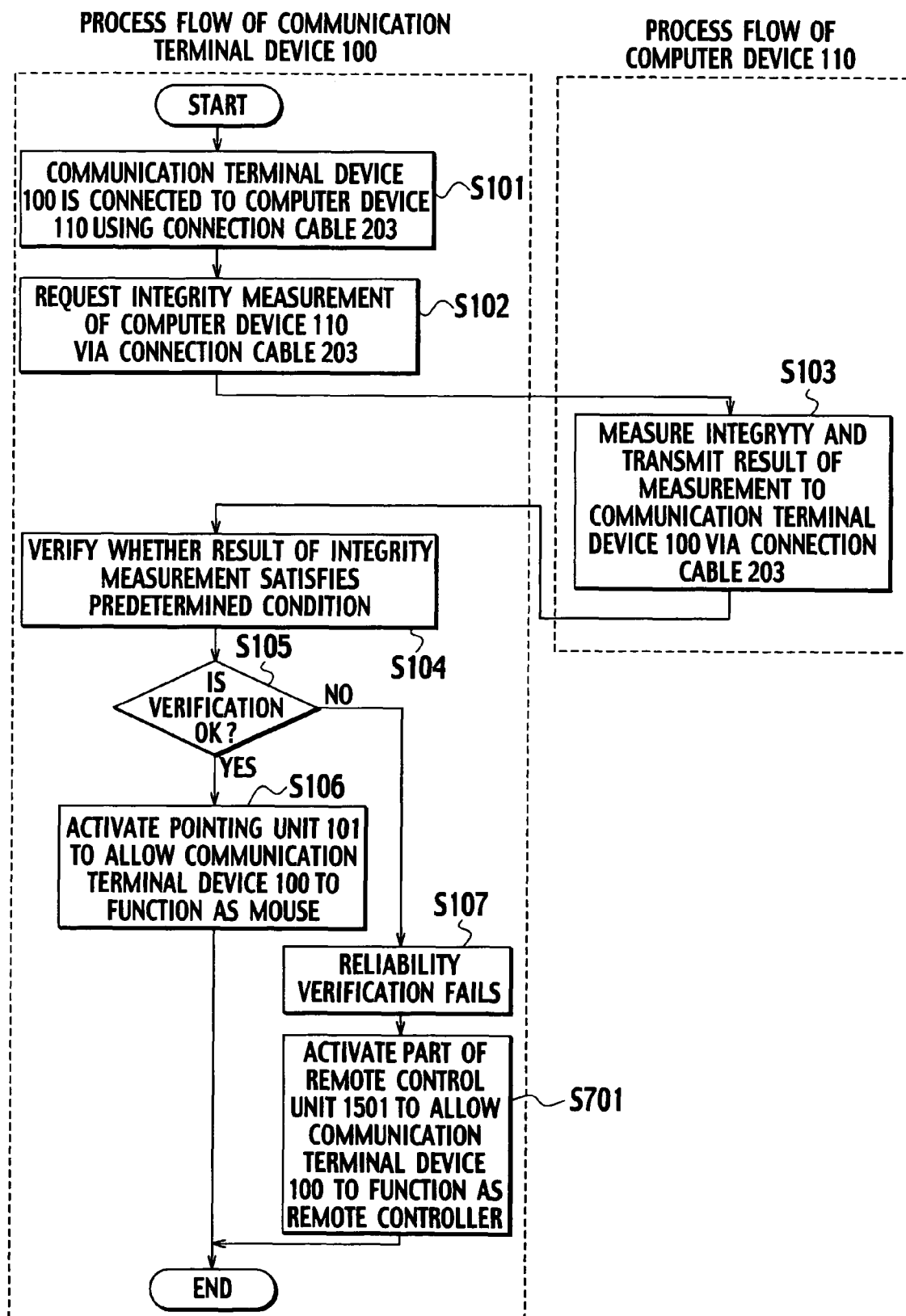
FIG. 17 is a flowchart showing a reliability verification system according to an eleventh embodiment.

FIG. 17 is a chart showing an example of a process flow of this embodiment. Steps of FIG. 17 same as those of FIG. 3 are as described above, and the description thereof is omitted.

In the step S701 of FIG. 17, the communication terminal device 100 activates a part of the remote control unit to function as a remote controller. Herein, the part of the function is limited to a part not concerning the content copyright protection, for example, such as turning on/off of the display, volume adjustment, image quality adjustment, change of free contents (channels), and turning on/off of display of time information.

(Operation and Effect)

According to the eleventh embodiment, even if the integrity verification of the computer device 110 fails, the communication terminal device 100 can continue to provide a basic function of remote control without violating the content copyright protection.

Twelfth Embodiment (Communication System)

Figure 18:
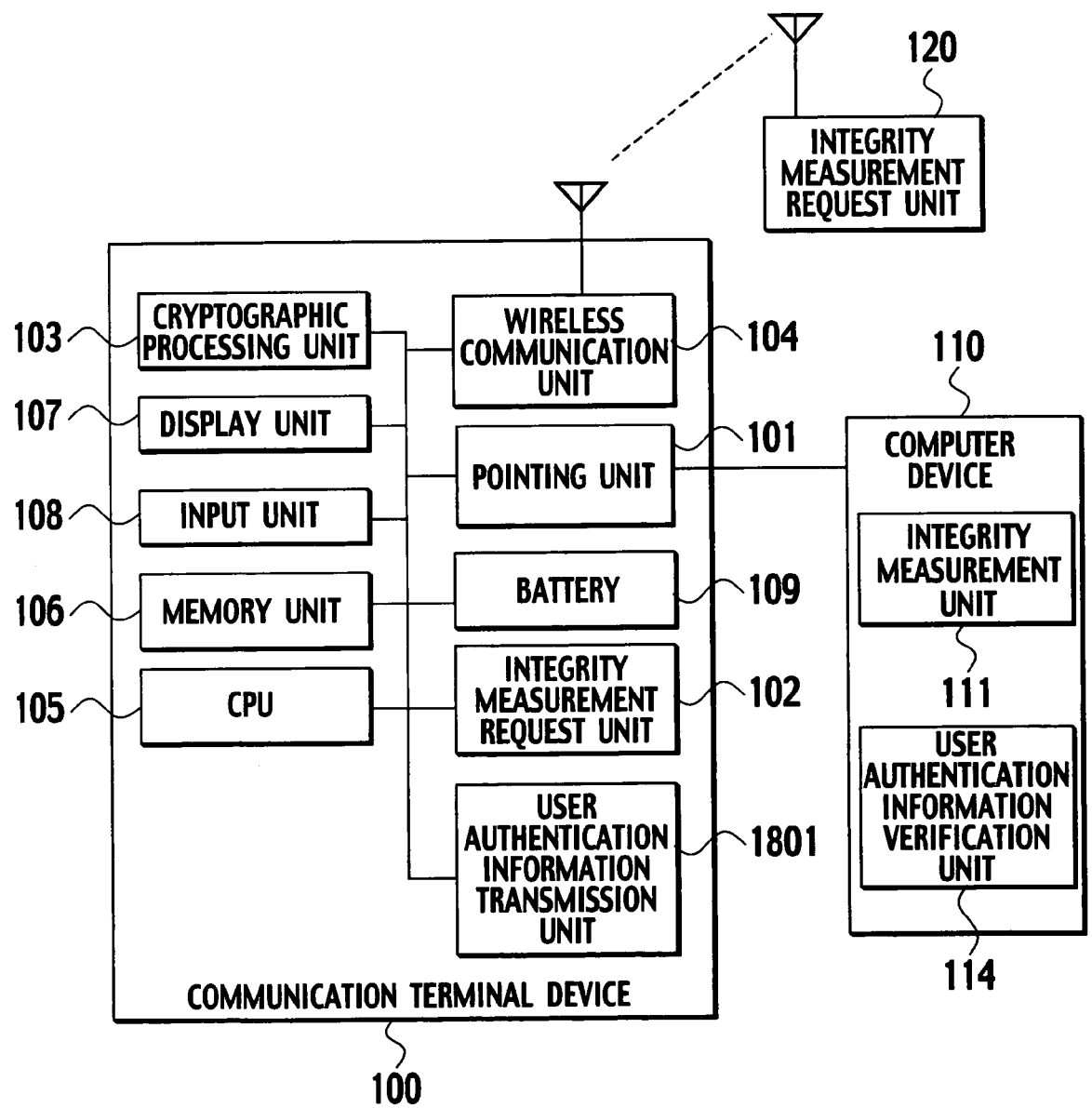
FIG. 18 is a block diagram showing a communication system according to a twelfth embodiment.

A communication system according to a twelfth embodiment includes the communication terminal device 100, computer device 110, and a server device 120 of a trusted third party as shown in FIG. 18.

The communication terminal device 100 according to the twelfth embodiment includes the pointing unit 101, the integrity measurement request unit 102, the cryptographic processing unit 103, the wireless communication unit 104, the CPU 105, the memory unit 106, the display unit 107, the input unit 108, the battery 109, and a user authentication information transmission unit 1801.

The memory unit 106 previously stores user authentication information specific to the user.

The user authentication transmission unit 1801 transmits the user authentication information to the computer device 110 only when the result of integrity verification of the computer device 110 satisfies the predetermined condition.

The other units of the communication terminal device 100 are the same as those of the first embodiment, and the description thereof is omitted.

The computer device 110 includes an integrity measurement unit 111 and a user authentication information verification unit 114.

The user authentication information verification unit 114 verifies the user authentication information received from the communication terminal device 100 and changes the item of integrity measured by the integrity measurement unit 111 according to the user authentication information.

Details of the integrity measurement unit 111 related to the twelfth embodiment are described later. The other units of the computer device 110 and the server device 120 are the same as those of the first embodiment, and the description thereof is omitted.

(Reliability Verification Method)

Figure 19:
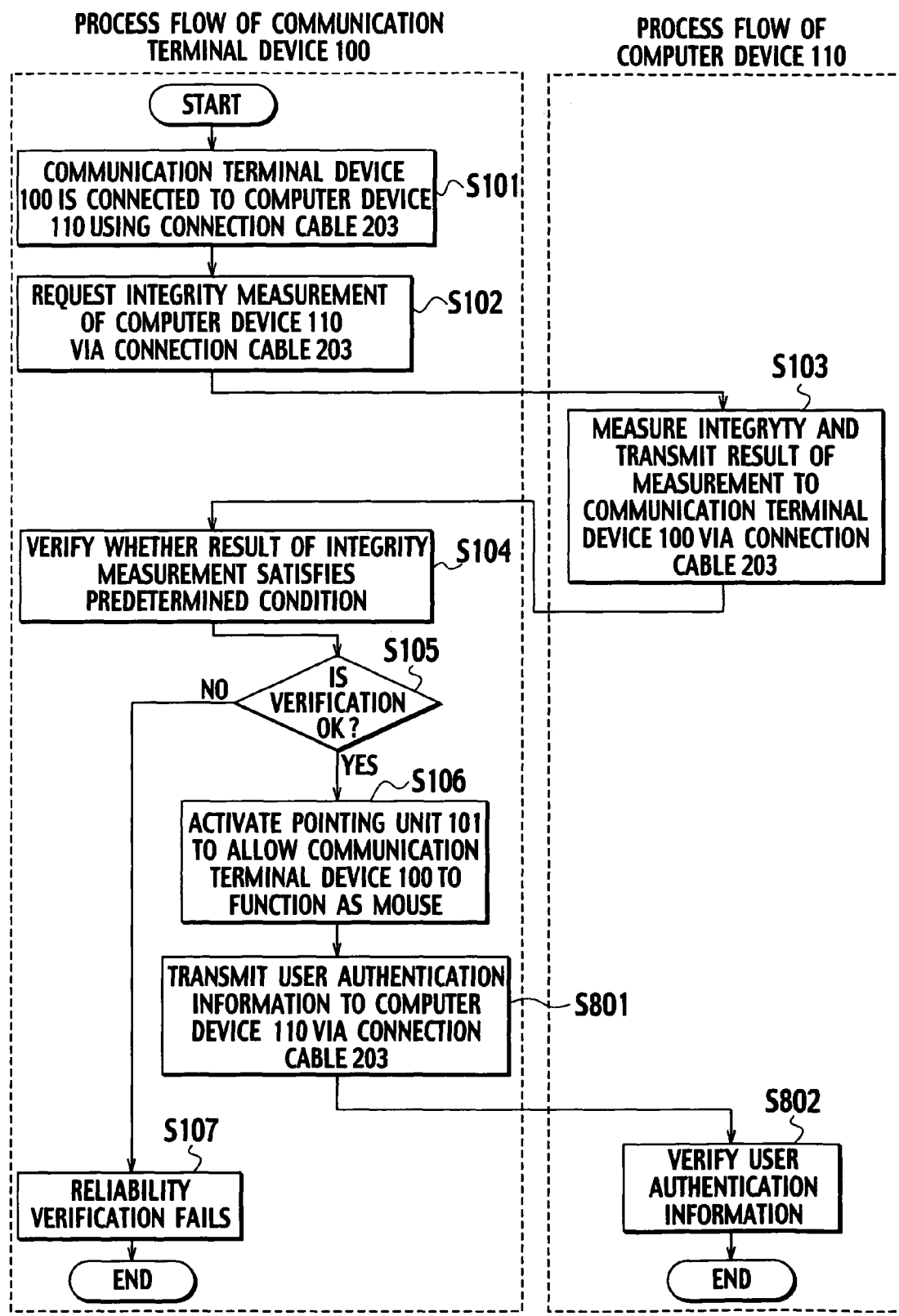
FIG. 19 is a flowchart showing a reliability verification method according to the twelfth embodiment.

FIG. 19 is a chart showing an example of a process flow according to the twelfth embodiment. This embodiment is described in more detail using FIG. 19. Steps of FIG. 19 same as those of FIG. 3 are as described above, and the description thereof is omitted.

The memory unit 106 of the communication terminal device 100 previously stores the user authentication information allowing the user to be identified as a premise. The user authentication information may be, for example, an arbitrary string (a combination of a user ID and a password) or biological information such as fingerprint. Moreover, the user authentication information may be subscriber information issued by a telecommunication company. In this case, the memory unit 106 may be substituted with a removable IC card such as User Identity Module (UIM).

In the twelfth embodiment, processes of steps S801 and S802 are added after the step S106 of FIG. 3. The communication terminal device 100 activates the pointing unit 101 to function as a mouse of the computer device 110 in the step S106. Immediately thereafter (simultaneously or immediately before that), the communication terminal device 100 transmits the user authentication information to the computer device 110 via the connection cable 203 using the user authentication information transmission unit 1801. Next, the computer device 110 verifies the received user authentication information in the step S1802 and then terminates the process.

(Operation and Effect)

According to the twelfth embodiment, the result of the verification of the user authentication information in the step S802 can be used for various purposes. For example, when the verification succeeds, it can be designed that the user can automatically log into the computer device 110 using the user information, thus saving the user the trouble of performing key operations for login. In the case where the user authentication information is the subscriber information, when the verification succeeds, it is possible to charge fees for the computer device 110 and a service received through the computer device 110 (for example, electronic commerce) via the telecommunication company. A conventional computer device does not include a hardware module reliable in charge. However, using the communication terminal device 100 (or UIM) as a reliable hardware module allows secure charged services to be realized.

(Modification)

As a modification, the memory unit 106 does not previously store the user authentication information allowing the user to be identified in the memory unit 106, and instead the communication terminal device 100 may prompt the user to input the user authentication information when needed (for example, in the step S801). The user, for example, inputs the user ID and password using the keypad of the input unit 108. As another modification, the input unit 108 (or part of the same) is substituted with a fingerprint scan unit, and the user inputs fingerprint information to the fingerprint scan unit.

Inputting the user authentication information when needed in such a manner makes it possible to avoid the situation where a person who is not a normal user takes advantage of the communication terminal device 100 to use the computer device 110 even when the communication terminal device 100 is stolen (or lost).

Thirteenth Embodiment (Communication System)

A communication system according to a thirteenth embodiment is the same as that of the twelfth embodiment shown in FIG. 18, and the description thereof is omitted.

(Reliability Verification Method)

FIG. 20 is a chart showing an example of a process flow according to the thirteenth embodiment. This embodiment is described in more detail using FIG. 20. Steps of FIG. 20 same as those of FIG. 3 are as described above, and the description thereof is omitted.

In the thirteenth embodiment, processes of steps S901 to S903 are added after the step S102 of FIG. 3. In the step S901, the communication terminal device 100 transmits the user authentication transmission to the computer device 110 via the connection cable 203 using the user authentication information transmission unit 1801. In the present invention, the steps S102 and S902 may be simultaneously processed, or the processing order of the steps S102 and S901 may be changed. Next, in the step S902, the computer device 110 verifies the received user authentication information and proceeds to the step S903. In the step S903, the computer device 110 determines an object of the integrity measurement according to the user authentication information. For example, in the case of a general user, virus check or update check of security patch files are executed. In the case of a user with administrative privileges or an owner of the computer device 110, tampering check of the computer configuration including an operating system is executed.

(Operation and Effect)

According to the thirteenth embodiment, using the result of the verification of the user authentication information in the step S902 makes it possible to dynamically address security requirements different for each user. For example, in the case of a general user, easy integrity measurement is carried out, so that the time to wait for processing of the computer device 110 (time taken for the step S103) is shortened, improving the convenience. On the other hand, a user who performs a process requiring high level of security, such as electronic copyright management, electronic commerce, or an access to a corporate information system, is specified by the user authentication information (specified by a company employee ID or account information of an electronic commerce provider). Accordingly, a more accurate integrity measurement appropriate thereto is executed, thus enhancing the security.

What is claimed is:

1. A communication terminal device, comprising:
   an integrity measurement request unit to generate a command to request another computer device located externally to the terminal device to determine whether a configuration of the another computer device is in accordance with a predetermined condition specifying that the another computer device is free of malicious software and hardware that steals a user's inputted information or destroys data;

a cryptographic processing unit to perform cryptographic processing concerning communication with the another computer device;

a pointing unit to operate as a pointing device of the another computer device upon determination that the predetermined condition is satisfied, the another computer device providing visual indication, upon operation of the pointing device, that the predetermined condition is satisfied, the visual indication undetectable by malicious software and hardware; and a secret information editing unit to edit secret information, wherein the secret information is only known to a user of the communication terminal and specified and edited by the user of the communication terminal device, wherein the secret information is classified into one of two types: one is used when a verification result of integrity satisfies the predetermined condition, and the other is used when the verification result of integrity does not satisfy the same.

2. The communication terminal device according to claim 1, further comprising:
a secret information transmission unit to transmit the secret information to the another computer device upon determination that the predetermined condition is satisfied.

3. The communication terminal device according to claim 1, further comprising:
an integrity measurement unit configured to determine whether the configuration of the another computer device is in accordance with the predetermined condition.

4. The communication terminal device according to claim 1, further comprising:
an integrity verification result display unit to display a result of the determination of whether the predetermined condition is satisfied.

5. The communication terminal device according to claim 1, further comprising:
a speaker unit to represent a result of the determination of whether the configuration of the another computer device is in accordance with the predetermined condition by sound.

6. The communication terminal device according to claim 1, further comprising:
a vibration generation unit configured to represent a result of the determination of whether the configuration of the another computer device is in accordance with the predetermined condition by vibration.

7. The communication terminal device according to claim 1, further comprising:
at least one button, wherein
the integrity measurement request unit requests, upon operation of the at least one button, the another computer device to determine whether the configuration of the another computer device is in accordance with the predetermined condition.

8. The communication terminal device according to claim 1, further comprising:
a battery to be supplied with power from the another computer device.

9. The communication terminal device according to claim 1, further comprising:
a log data reception unit to receive execution log data of operation performed by the another computer device; and,
a storage unit to store the log data.

10. The communication terminal device according to claim 1, further comprising:
a user authentication information transmission unit to transmit user-specific authentication information to the another computer device upon determination that the predetermined condition is satisfied.

11. The communication terminal device according to claim 1, wherein the predetermined condition specifies that at least one of a boot process, an operating system loader, and an operating system of the another device is free of the malicious software and hardware that steals a user's inputted information or destroys data.

12. The communication terminal device according to claim 1, wherein the predetermined condition specifies that the another computer device be free of malicious software or hardware configured to steal data transferred from the terminal device to the another computer device.

13. The communication terminal device according to claim 1, wherein the secret information specifies a format of the visual indication.

* * * * *